United States Patent
Tadayon

(10) Patent No.: US 11,438,734 B2
(45) Date of Patent: Sep. 6, 2022

(54) LOCATION PREDICTION USING HIERARCHICAL CLASSIFICATION

(71) Applicant: Navid Tadayon, Kanata (CA)

(72) Inventor: Navid Tadayon, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/064,729

(22) Filed: Oct. 7, 2020

(65) Prior Publication Data
US 2022/0109950 A1 Apr. 7, 2022

(51) Int. Cl.
*H04W 4/029* (2018.01)
*G06N 3/04* (2006.01)
*G06N 3/08* (2006.01)

(52) U.S. Cl.
CPC .......... *H04W 4/029* (2018.02); *G06N 3/0454* (2013.01); *G06N 3/08* (2013.01)

(58) Field of Classification Search
CPC ........ H04W 4/029; G06N 3/0454; G06N 3/08
See application file for complete search history.

(56) References Cited

U.S. PATENT DOCUMENTS

| | | | | |
|---|---|---|---|---|
| 2008/0086261 A1* | 4/2008 | Robinson | ................. | A63F 13/12 701/532 |
| 2013/0178231 A1 | 7/2013 | Morgan | | |
| 2019/0166466 A1* | 5/2019 | Diamanti | ................. | G06N 3/08 |
| 2021/0337354 A1* | 10/2021 | Faustino | ............... | G01S 5/0018 |

FOREIGN PATENT DOCUMENTS

| | | |
|---|---|---|
| CN | 108470213 A | 8/2018 |
| CN | 108696932 A | 10/2018 |
| CN | 108769969 A | 11/2018 |

OTHER PUBLICATIONS

P. Bahl and V. Padmanabhan, "RADAR: An in-building RF based user location and tracking system," in 19th Annu. Joint Conf. IEEE Comput. Commun. Soc., Tel Aviv, Israel, 2000, pp. 775-787.
S. Han, C. Zhao, W. Meng and C. Li, "Cosine similarity based fingerprinting algorithm in WLAN indoor positioning against device diversity," in IEEE Int. Conf. Commun. (ICC), London, U.K., 2015., pp. 2710-2714.
A. Decuminge, L. Ordóñez, P. Ferrand, H. Gaoning, L. Bojie, Z. Wei, and M. Guillaud, "CSI-based outdoor localization for massive MIMO: Experiments with a learning approach," in Intl. Symp. Wireless Comm. Sys. (ISWCS), Lisbon, Portugal, Aug. 2018, pp. 1-6.
X. Wang, L. Gao, S. Mao and S. Pandey, "CSI-Based Fingerprinting for Indoor Localization: A Deep Learning Approach," IEEE Transactions on Vehicular Technology, vol. 66, No. 1, pp. 763-776, Jan. 2017.

* cited by examiner

Primary Examiner — Marcos L Torres

(57) ABSTRACT

Some embodiments of the present disclosure provide a neural network location classifier that is designed and trained in accordance with a hierarchical architecture, thereby producing a hierarchical neural network location classifier. Further embodiments relate to obtaining, through use of the hierarchical neural network location classifier, an inferred hierarchical label for a user equipment location. The inferred hierarchical label may then be decoded to obtain a location.

25 Claims, 13 Drawing Sheets

LOCATION PREDICTION USING HIERARCHICAL CLASSIFICATION

TECHNICAL FIELD

The present disclosure relates generally to location prediction and, in particular embodiments, to location prediction using hierarchical classification.

BACKGROUND

There currently exist multiple manners in which a device may determine its own location in a three-dimensional (3D) space. For example, using a Global Positioning System (GPS), the device may base a location self-determination on signals received from a plurality of satellites. If the device is configured to communicate using local area wireless technology (e.g., Wi-Fi) or short-wavelength radio waves (e.g., Bluetooth™), analysis of signal strength in conjunction with awareness of a static location of transmitting stations may allow the device to self-determine a location. However, each of these technologies carry with them flaws that lead to potential for an imprecise determination of location. In the case of GPS, received power is often too low, due to distance, for accurate location determination. In the case of Wi-Fi, multi-path interference may cause timing variations for signals received by the device.

SUMMARY

Some embodiments of the present disclosure provide a neural network location classifier that is designed and trained in accordance with a hierarchical architecture, thereby producing a hierarchical neural network location classifier. Further embodiments relate to obtaining, through use of the hierarchical neural network location classifier, an inferred hierarchical label for a user equipment location. The inferred hierarchical label may then be decoded to obtain a location.

According to an aspect of the present disclosure, there is provided a single-transmission-point user equipment (UE) locating method, the method includes receiving a normalized input tensor and obtaining, through use of a hierarchical neural network location classifier, an inferred hierarchical label for a location corresponding to the normalized input tensor. The method further includes obtaining a predicted location by decoding the inferred hierarchical label and transmitting an indication of the predicted location. Additionally, aspects of the present application provide an apparatus for carrying out this method and a computer-readable medium storing instructions that cause a processor to carry out this method.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1:
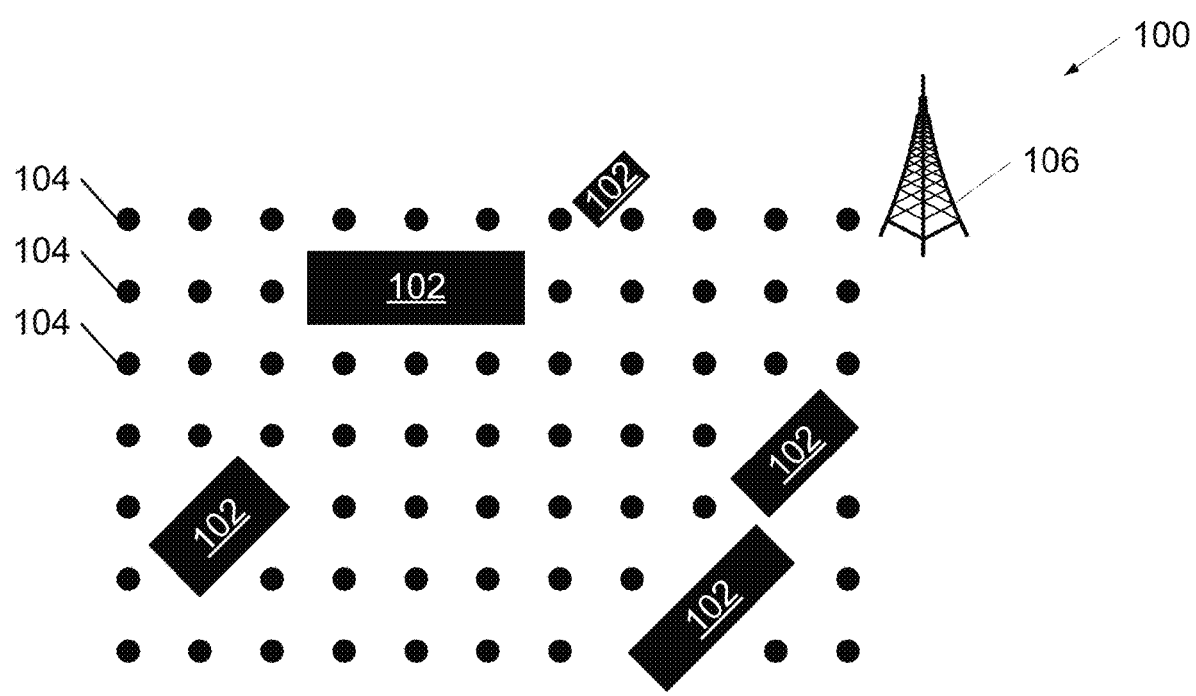
FIG. 1 illustrates an environment for a mobile communication device including a plurality of clutter elements.

FIG. 1 illustrates an environment 100 for a mobile communication device (or user equipment, "UE," not shown in FIG. 1). The environment 100 includes a plurality of clutter elements 102 (e.g., walls, etc.) that, depending upon the location of the mobile communication device, prevent the mobile communication device from receiving a so-called line-of-sight (LoS) channel from a transmission point ("TP" or base station) 106.

In the context of the known (flat, classic, non-hierarchical) fingerprinting approach, a surveyor (not shown) may "survey" the environment 100 of FIG. 1 in the presence of a channel transmitted by the base station 106. The surveyor may consider the environment 100 of FIG. 1 to include a plurality of grid points 104, only three of which are directly associated with the reference numeral 104. To "survey," the surveyor: navigates through the meshed environment; stops at each grid point 104 to probe the channel transmitted by the base station 106; estimates coordinates for the grid point 104; randomly associates a location label to the grid point 104; determines a channel data tensor; records the channel data tensor as a fingerprint; and pairs the fingerprint with the location label. When estimating the coordinates for the grid point 104, the surveyor may use a global coordinate system, as is conventional.

Location determination using fingerprinting is known to enable the UE to determine its location based on signals received from one or more base stations 106. Based on the signals received from the one or more base stations 106, the UE can determine a measured channel data tensor. By matching the measured channel data tensor to a previously recorded fingerprint, the UE can determine a label for its location. The UE can then convert the label to coordinates that are associated with the label. Notably, where none of the channels over which the signals are received are LoS channels, fingerprinting is particularly useful.

The facilitation of a universal use of location determination using fingerprinting may be understood to involve the UE storing the fingerprints with associated locations. Unfortunately, the huge number of fingerprints that would allow for such universal use of location determination using fingerprinting may be shown to be impractical. Indeed, both the amount of memory that would be used and the amount of computation power that would be used help to establish the impracticality of universal use of location determination using fingerprinting.

In an effort to reduce the amount of memory and computation power that would be used, use of deep learning has been suggested. Deep learning is part of a family of machine learning (ML) methods based on artificial neural networks with representation learning. Deep learning architectures, such as deep neural networks, deep belief networks, recurrent neural networks and convolutional neural networks have been applied in a plurality of fields.

The problem of location determination using fingerprinting may be cast as a neural classification task. Deep learning is known to be suitable to neural classification tasks. That is, given a single input tensor of data, a deep learning model can produce a classification of the input tensor of data and also indicate a degree of confidence to associate with the classification. Producing a classification of the input tensor of data may be understood to involve determining that the input tensor of data belongs to a particular class. If each grid point 104 in the environment 100 of FIG. 1 is converted to a fingerprint and each known fingerprint is considered to be a class, it follows that a deep learning model may be employed to classify a given input tensor of data as a particular known fingerprint. As is conventional, the fingerprint may be converted to a location.

Location determination using fingerprinting while employing deep learning models may be shown to have an advantage in that an original, single, huge dataset of channel tensors may be compacted into a classifier implemented as a neural network (NN) defined by several millions of parameters. Notably, although the task of storing several millions of parameters may, at first, appear daunting, it turns out that storing these parameters uses much less memory than the memory used to store the original dataset.

Figure 2:
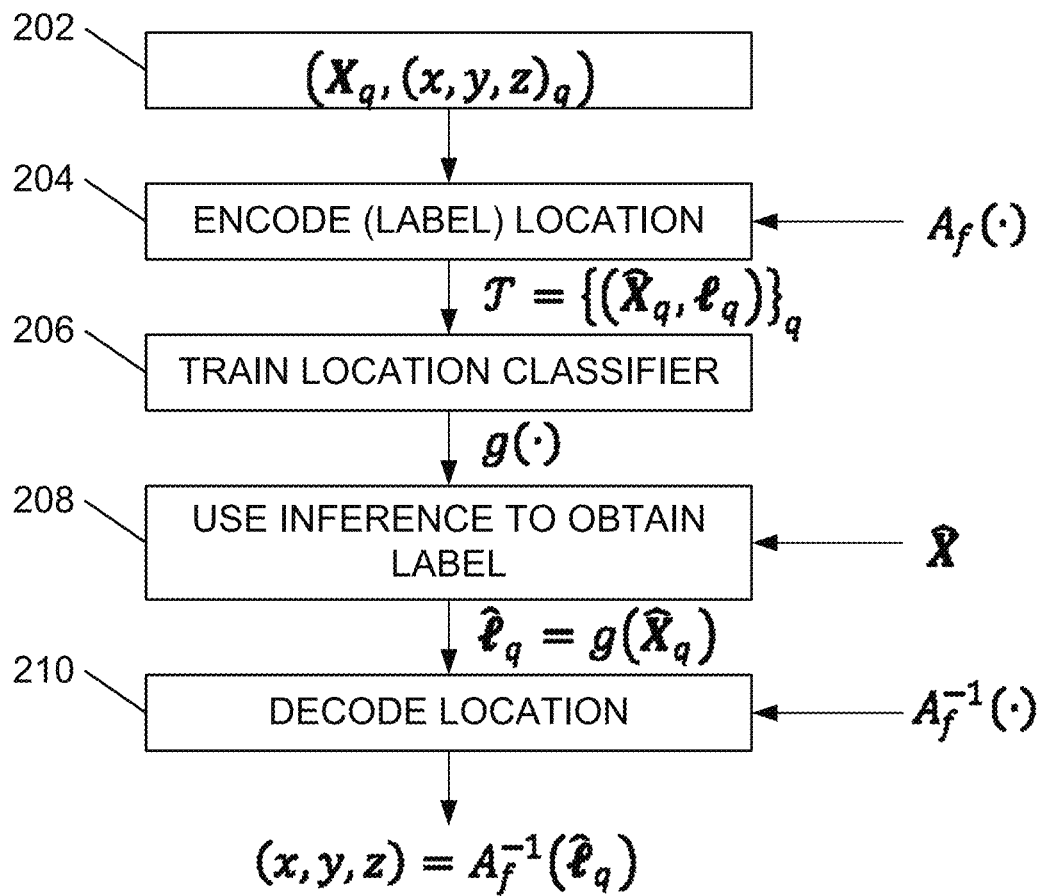
FIG. 2 illustrates stages in a known manner of determining location using fingerprinting while employing a flat neural network location classifier.

FIG. 2 illustrates stages in a known manner of determining location using fingerprinting while employing a flat NN location classifier. A first stage 202 involves data collection. As discussed hereinbefore, a surveyor may survey an environment, such as the environment 100 of FIG. 1, to obtain a channel data tensor (a fingerprint) for each grid point 104. The channel data tensor may also be called an input tensor. Furthermore, the input tensor may be normalized for reasons that will be discussed hereinafter. Each normalized input tensor, $\hat{X}_q$, may be associated with a location, $(x,y,z)_q$.

In a second stage 204, flat location encoding (labeling) takes place. Each grid point (fingerprint location, q) is associated, in the second stage 204, with a flat label, $\ell_q$. The second stage 204 may be represented as a flat labelling function, $A_f(\bullet)$, that receives, as input, a location, $(x,y,z)_q$, and produces, as output, a flat label, $\ell_q$. In this way, output from the second stage 204 may be an entire training dataset $\mathcal{T} = \{(\hat{X}_q, \ell_q)\}_q$ that includes the flat label, $\ell_q$, and the normalized input tensor, $\hat{X}_q$, for each of the plurality of grid points 104 (fingerprint locations, q).

The training dataset $\mathcal{T} = \{(\hat{X}_q, \ell_q)\}_q$ may be used in a third stage 206 to train a flat NN location classifier. The flat NN location classifier may be represented as a function, $g(\bullet)$, that receives, as input, a normalized input tensor, $\hat{X}_q$, and produces, as output, an inferred flat label, $\hat{\ell}_q$, that is, $\hat{\ell}_q = g(\hat{X}_q)$.

A fourth stage 208 may be considered to be representative of operation of an artificial intelligence (AI) engine. Upon receipt of a normalized input tensor, $\hat{X}_q$, the AI engine may employ the trained flat NN location classifier to obtain the inferred flat label, $\hat{\ell}_q$.

A fifth stage 210 may be considered to be representative of operation of a location management function. Subsequent to receiving the inferred flat label, $\hat{\ell}_q$, the location management function may employ an inverse of the flat labelling function, $A_f(\bullet)$, to convert the inferred flat label, $\hat{\ell}_q$, to a location, $(x,y,z)$, that is, $A_f^{-1}(\hat{\ell}_q) = (x,y,z)$.

However, simply casting the problem of location determination using fingerprinting as a task to be handled by a flat NN location classifier suffers from other issues. These issues include learning complications (at the third stage 206) along with high memory use and extensive computation time (at the fourth stage 208).

Consider a first example in which a 100 m by 100 m area is surveyed, with a resolution of 1 m by 1 m. In the first example, the surveying would involve recording 10,000 fingerprints and pairing, in a training dataset, each of these 10,000 fingerprints with each unique one of 10,000 corresponding location labels.

Consider a second example in which a 10 km by 10 km city is surveyed. With the same resolution (1 m by 1 m), the number of fingerprints and location labels to record in a training dataset is 100,000,000.

Treating each location label as a single class requires training a flat NN location classifier with as many outputs as there are location labels. Training such a gigantic flat NN location classifier using known learning algorithms may be considered nearly impossible in terms of convergence.

The flat NN location classifier to be trained for the second example will be enormous in size. Concretely, if the penultimate layer of this flat NN location classifier has only 1% as many neurons as there are outputs, it can be determined that the flat NN location classifier will have 1e+14 weights at the last layer. Restricting these weights to only half-precision (two bytes) and given that training at each epoch not only requires storage of weights, but activations, gradients, etc., training this flat NN location classifier may be expected to use at least a petabyte of read only memory (RAM). Approaches that apply distributed learning algorithms, e.g., splitting the flat NN location classifier between multiple graphics processing units (GPUs), have been considered but, even using those approaches, it has been considered that training such a gigantic flat NN location classifier remains nearly impossible.

Aspects of the present application relate to a hierarchical approach to location determination using fingerprinting. The hierarchical approach is known in the field of "multi-task learning" in ML. When employing a multi-task learning algorithm, an inherent hierarchy in a set of data is exploited by reusing learned concepts when classifying an input as belonging to an umbrella class to improve classifying the input as belonging to a sub-class. For instance, when the task is to classify various images of pets as being images of particular breeds of dogs and cats, a hierarchical NN image classifier can start by classifying the features that distinguish cats from dogs before moving on to distinguishing (classifying) an image of a "bulldog" from an image of a "Labrador dog" or an image of a "Persian cat" from an image of a "Sphynx cat."

All cats have some common features (e.g., pointy ears, pronounced whiskers) that can help a hierarchical NN image classifier to distinguish an image of a cat from an image of a dog. Furthermore, there are different breeds (classes) of cat that differ from each other in some more distinctive ways. Cross-breeding between these breeds (classes) results in new breeds (classes) that carry common features with their parent breeds (classes). Because all cats may be considered to have common features, such as having pointy ears and pronounced whiskers, it may be considered to be more efficient, in terms of learning and model size, to primarily learn to distinguish an image of a cat from an image of a dog based on common cat features before, secondarily, moving on to distinguish an image of a Persian cat from an image of a Sphynx cat based on finer differences, such as having a different density of fur and having a different skin color, etc.

Notably, the hierarchical NN image classifier, once trained, can be used at all times and locations. This is not the case for a hierarchical NN location classifier.

A location label within a training dataset collected in a first environment may be shown to have no relation to the same location label within a fingerprint database collected in a second environment. It follows that a hierarchical NN location classifier trained on the training dataset collected in the first environment is unusable for inferring labels for locations inside the second environment. Accordingly, the cost of surveying is not a single-shot task but accumulates in time and space. This is due to underlying, so-called factors of variation (FoV). The FoV differ between the first environment and the second environment.

A hierarchical architecture may be used to guide a learning algorithm towards establishing common/parental features before moving on to settling more detailed differences. A hierarchical NN location classifier, designed and trained using a hierarchical architecture, may be shown to be smaller than a flat NN classifier, designed and trained using a flat architecture, wherein all classes are treated in the same way. Conveniently, the hierarchical NN classifier may be shown to capture dependencies better than the flat NN classifier. Accordingly, it may be shown that the smaller hierarchical NN classifier makes fewer catastrophic classification mistakes than the larger flat NN classifier, e.g., classifying a cat as a dog or vice versa.

In overview, aspects of the present application relate to designing and training a NN location classifier in accordance with a hierarchical architecture thereby producing a hierarchical NN location classifier. Further aspects of the present application relate to obtaining, through use of the hierarchical NN location classifier, an inferred hierarchical label for a UE location.

The FoVs that cause a channel, received at a receiver from a transmission point, to exhibit multipath behavior are affected by factors such as a location of the receiver, an orientation of the receiver and electrical properties of clutter that may be illuminated by the channel. Within a periphery of several meters, many locations exist that are affected by multipath reflections from the same clutter.

An idea has been established hereinbefore that a channel is most likely to be affected by the same objects when received in locations in the same periphery. In contrast, a channel is most likely to be affected by different objects when received in locations distant from one another. Aspects of the present application relate to exploiting this idea to design and train a deep learning NN location classifier. To reduce use of storage and reduce computation overhead while also reducing training time, aspects of the present application relate to adopting a hierarchical design and training approach to the NN location classifier.

Ideally, it is expected that the hierarchical nature of wireless channel degradation can be exploited to improve accuracy in location determination using a deep neural network location classifier trained on a hierarchical training dataset of wireless data. Indeed, determining which grid points fall into the same hierarchies, which means determining which grid points are impacted by the same clutter, involves characterizing the environment. Such characterizing may be accomplished, for example, using ray-tracing. Notably, the characterization of the environment may be considered to be a more challenging task than location determination using a hierarchical NN location classifier.

To exploit environment characterization information for training the hierarchical NN location classifier, aspects of the present application involve using a hierarchical representation to encode output from the hierarchical NN location classifier. Such a representation is in contrast to the so-called "one-hot" representation, which has been used to encode output from known flat NN location classifiers. A one-hot representation is a representation in which categorical variables are converted into a form that may be provided to an ML algorithm to improve the predictions of the ML algorithm.

To distinguish among a plurality of hierarchies, each hierarchy may be given a hierarchical label. In the hierarchical representation that is specific to aspects of the present application, within each hierarchy among the plurality of hierarchies, grid points are represented with one-hot encoding.

To generate hierarchical labels, information is used. The information can be collected from UEs, using a partial map information that a positioning server possesses from the environment. Alternatively or additionally, the information can be collected by algorithmic processing of channel tensors, as will be further described hereinafter.

The environment 100 of FIG. 1 may represent a floorplan for a level of a building. In the absence of the clutter elements 102, the environment 100 of FIG. 1 would have 77 grid points 104, based on the grid being 11 points on an imagined x-axis and seven points on an imagined y-axis.

Conventionally, each grid point 104 of the floorplan 100 can be labelled using a one-hot representation, i.e., $\ell_q = [0, \bullet\bullet\bullet, 1, \bullet\bullet\bullet, 0]^T_{77 \times 1}$. Accordingly, if the flat NN location classifier described hereinbefore was designed for the environment 100 of FIG. 1, the flat NN location classifier would be expected to have 77 output neurons, one output neuron per label.

Designing and training a NN location classifier using a hierarchical architecture, rather than training the NN location classifier using a flat architecture (wherein all classes are treated in the same way), may be shown to result in a smaller NN location classifier.

Figure 3:
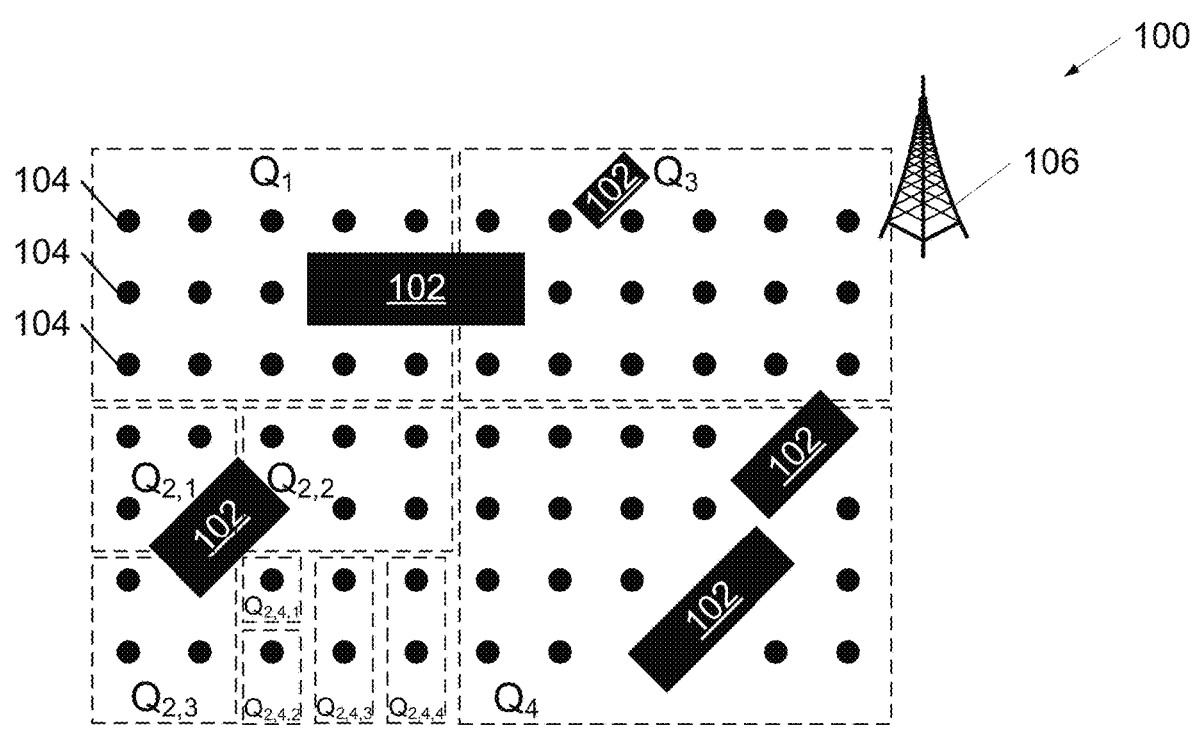
FIG. 3 illustrates an example distribution of labels using a three-level hierarchy in the environment of FIG. 1.

According to aspects of the present application, each grid point 104 of the environment 100 can be represented with a label in a hierarchy. An example distribution of labels using a three-level hierarchy is illustrated in FIG. 3, with a topmost level, a middle level and an innermost level. The example distribution of labels in FIG. 3 is presented relative to the environment 100 of FIG. 1. For the example distribution of labels in FIG. 3, a topmost level may be defined to include four classes, $\{Q_j\}_{j=1}^4$, a middle level may be defined to include four classes $\{Q_{j,i}\}_{i=1}^4$ and an innermost level may be defined to include four classes $\{Q_{j,i,r}\}_{r=1}^4$.

Accordingly, a hierarchical NN location classifier designed for the environment 100 of FIG. 3 would be expected to have 4+4+4=12 output neurons. Each grid point 104 in the hierarchical architecture may be assigned a three-part label, with each label part being a one-hot representation. For instance, each of the two grid points 104 in $Q_{2,4,3}$ may be represented by a label $\{[0,1,0,0], [0,0,0,1], [0,0,1,0]\}_{12 \times 1}$.

Figure 4:
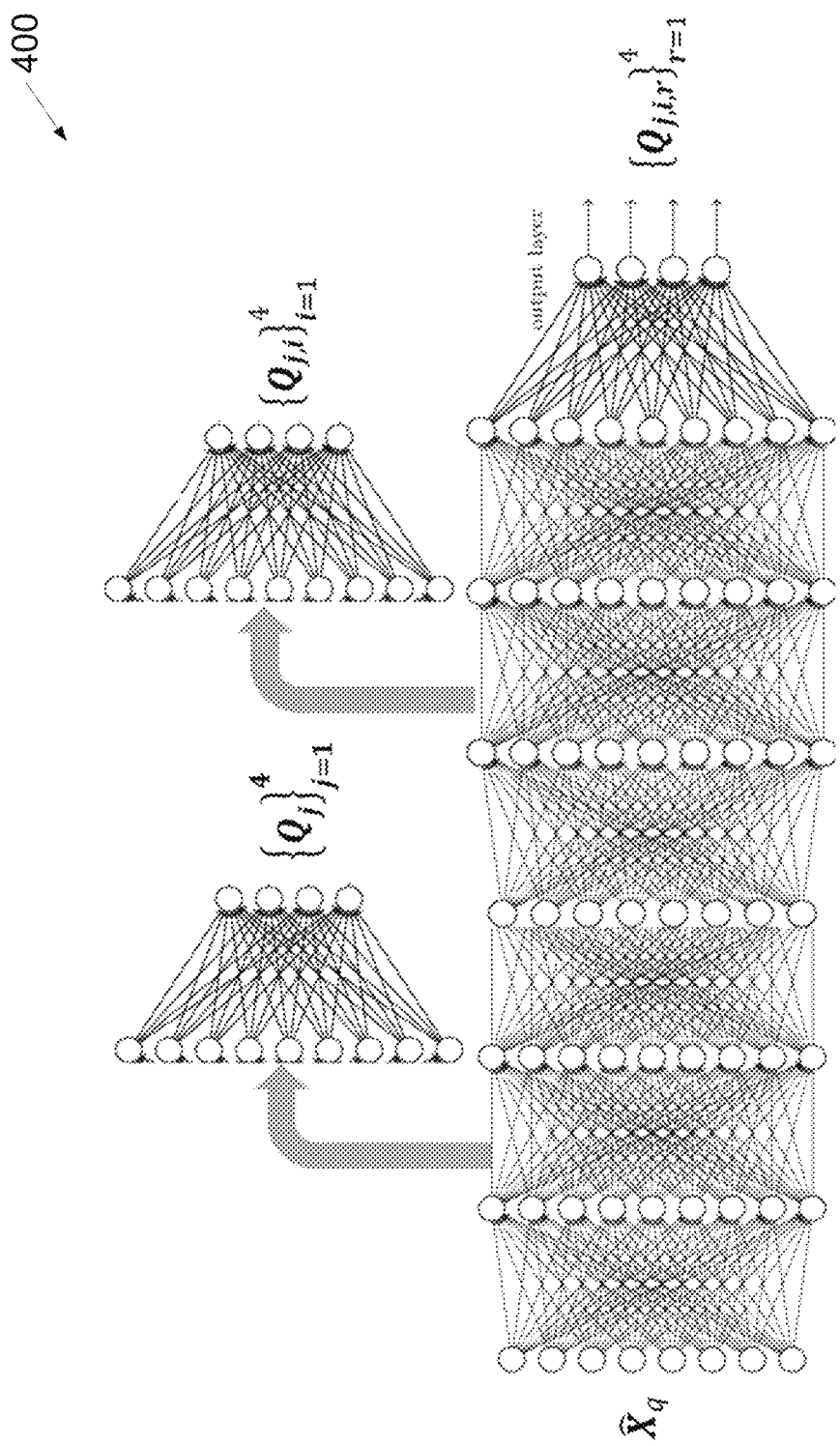
FIG. 4 illustrates a map of neurons for a hierarchical neural network location classifier for a hierarchical architecture of the type that may be applied to the environment of FIG. 3.

FIG. 4 illustrates a map 400 of neurons for a hierarchical NN location classifier for a hierarchical architecture of the type that may be applied to the environment 100 of FIG. 3. In the map 400 of FIG. 4, eight input neurons receive values of a normalized input tensor, $\hat{X}_q$. Additionally, four output neurons provide a topmost level label part, four output neurons provide a middle level label part and four output neurons provide an innermost level label part.

By expanding this example to the more realistic scenario of city-wide location classification, it may be illustrated that aspects of the present application can significantly reduce learning overhead. That is, the learning overhead for the hierarchical NN location classifier is expected to be less than the learning overhead for the flat NN location classifier. The reason for the reduced learning overhead may, in part, be due to the quantity of parameters concentrated in the final layer of each NN location classifier, for large surveying areas.

Approaches to location determination using fingerprinting have been pursued in both academia and industry due to such approaches providing UEs with an ability to self-determine location using measurements of a channel received from only a single base station. Reasons for intensifying interest in single-BS location determination solutions is multifold: first, the lack of synchronization induces an irreducible error to the location-determining problem that can hardly be fully eliminated with the current technology; and second, geometric (i.e., classic) location determination methods suffer from an inability to identify Non-Line-of-Sight (NLoS) channels and compensate for the inability. Unfortunately, without compensating for NLoS bias, location determination with geometric methods suffers from significant error. In contrast, location determination using fingerprinting follows a completely different methodology. UEs practicing location determination using fingerprinting may be shown to be negligibly impacted by the issues associated with the lack of an LoS channel.

The practice of fingerprinting by learning from data has been pursed in the past decade using various machine-learning tools. In P. Bahl and V. Padmanabhan, "RADAR: An in-building RF based user location and tracking system," in 19th *Annual Joint Conf. IEEE Comput. Commun. Soc.*, Tel Aviv, Israel, 2000 and S. Han, C. Zhao, W. Meng and C. Li, "Cosine similarity based fingerprinting algorithm in WLAN indoor positioning against device diversity," in *IEEE Int. Conf. Commun. (ICC)*, London, U. K., 2015, the authors promote the use of location determination using fingerprinting using classic ML algorithms, such as the known k-nearest neighbor (KNN) ML algorithms, to learn the location of users. Unfortunately, these approaches that promote the use of location determination using fingerprinting using classic ML algorithms may be shown to have limited learnability. Additionally, these approaches that promote the use of location determination using fingerprinting using classic ML algorithms may be shown to not be scalable, due to a need to store an entire dataset instead of storing a compressed representation of the dataset. With the emergence of deep learning models and deep learning NNs, use of classic ML algorithms for location determination using fingerprinting may be considered to have fallen out of fashion.

In A. Decurninge, L. Ordóñez, P. Ferrand, H. Gaoning, L. Bojie, Z. Wei, and M. Guillaud, "CSI-based outdoor localization for massive MIMO: Experiments with a learning approach," in *Inti. Symp. Wireless Comm. Sys. (ISWCS)*, Lisbon, Portugal, August 2018 and X. Wang, L. Gao, S. Mao and S. Pandey, "CSI-Based Fingerprinting for Indoor Localization: A Deep Learning Approach," *IEEE Transactions on Vehicular Technology*, vol. 66, no. 1, pp. 763-776, January 2017 approaches have been shown wherein NNs are able to efficiently learn inherent interdependencies between locations. Such efficient learning has been shown to allow these approaches to achieve prediction accuracy that is improved relative to the approaches that fail to efficiently learn. Despite the fact that these approaches were able to improve learnability, upon close inspection, it appears that these approaches remain to be useful only for indoor location determination, where the number of grid points (with which fingerprints may be associated) are limited. More specifically, as above-mentioned, using a flat NN location classifier for outdoor scenarios with millions of fingerprints, suffers from practicality issues.

Aspects of the present application relate to efforts to address the impracticality of flat NN location classifiers to outdoor scenarios, while maintaining advantages that deep neural networks offer in improving learnability in NN location classifiers.

Figure 5:
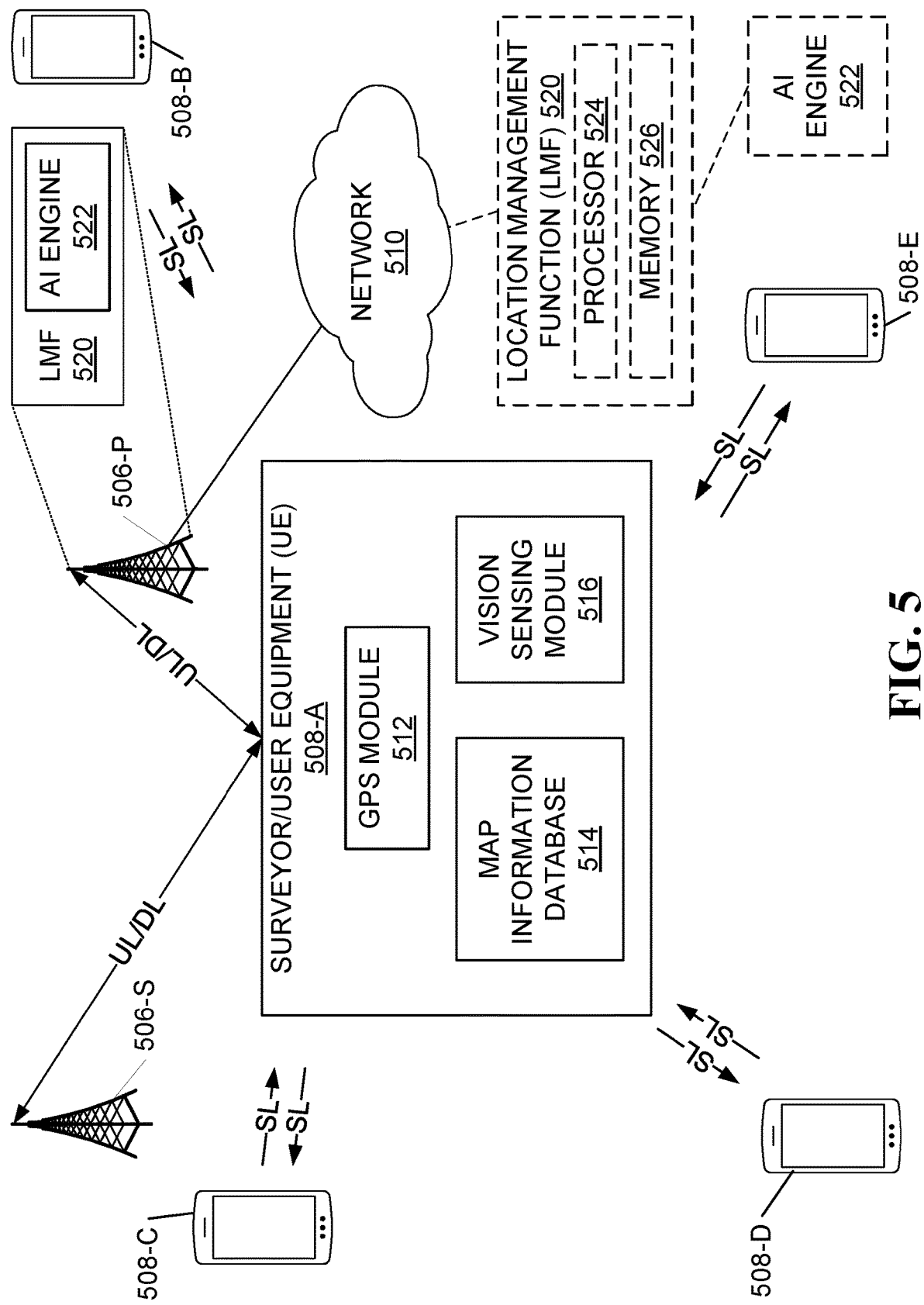
FIG. 5 illustrates a device that may be used to represent a surveyor in some phases of the location determination task and may be used to represent a primary user equipment in other phases of location determination task, in accordance with aspects of the present application.

FIG. 5 illustrates a device 508-A. As will be clear in the following, the device 508-A may be used to represent a surveyor in some phases of the location determination task and the device 508-A may be used to represent a primary UE in other phases of location determination task.

A primary base station 506-P is illustrated as communicating with the device 508-A. The device 508-A is also illustrated in communication with a secondary base station 506-S. Additionally, a plurality of neighboring UEs including a secondary UE 508-B and several other UEs 508-C, 508-D, 508-E (collectively or individually 508) is illustrated in FIG. 5. The device 508-A has several elements illustrated, including a GPS module 512, a map information database 514 and a vision sensing module 516. The primary base station 506-P includes a co-located location management function 520 and an AI engine 522. The primary base station 506-P is illustrated as connected to a network 510. Although the location management function 520 and the AI engine 522 are illustrated as co-located with the primary base station 506-P, in alternative aspects of the present application, the location management function 520 and the AI engine 522 are connected to the network 510.

Figure 6:
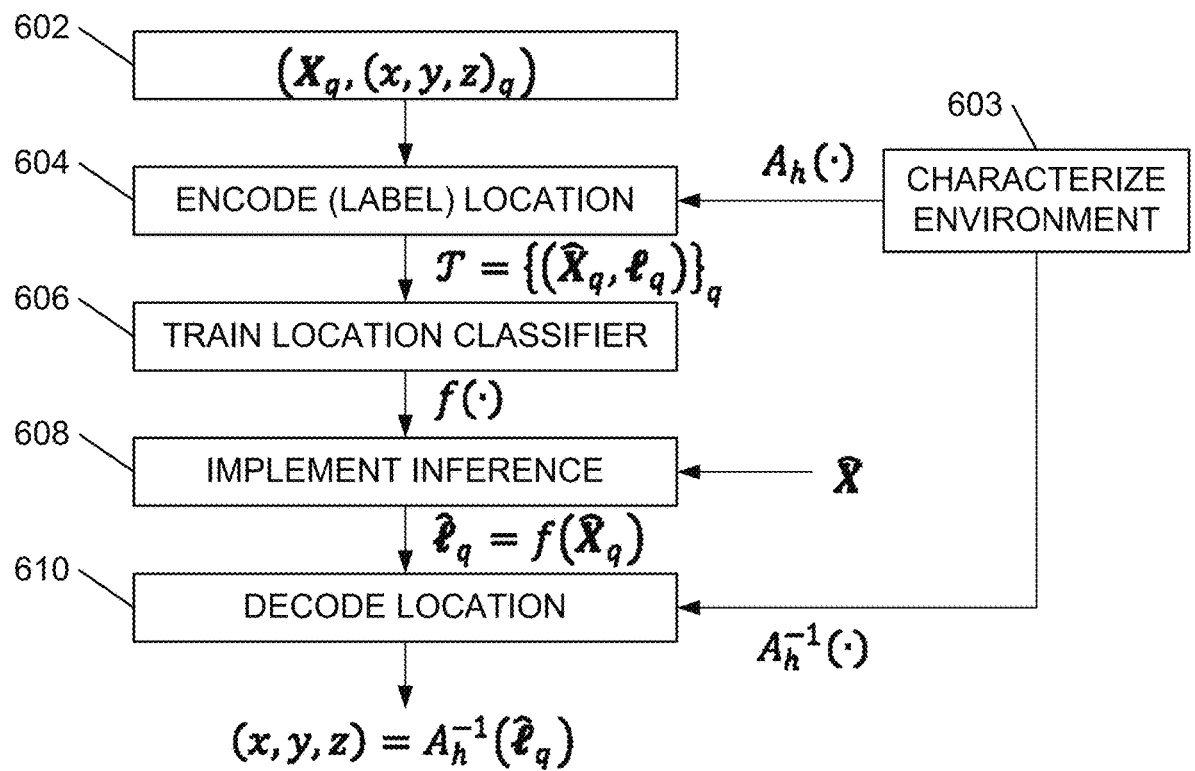
FIG. 6 illustrates stages in a manner of determining location using fingerprinting while employing a hierarchical neural network location classifier in accordance with aspects of the present application.

FIG. 6 illustrates stages in a manner of determining location using fingerprinting while employing a hierarchical NN location classifier in accordance with aspects of the present application. A first stage 602 involves data collection. As discussed hereinbefore, a surveyor may survey an environment to obtain a channel data tensor (a fingerprint) for each grid point 104. The channel data tensor may also be called an input tensor. Furthermore, the input tensor may be normalized for reasons that will be discussed hereinafter. Each normalized input tensor, $\hat{X}_q$, may be associated with a location, $(x,y,z)_q$.

In contrast to FIG. 2, the stages, presented in FIG. 6, of a manner of determining location using fingerprinting while employing a hierarchical NN location classifier include a sub-stage 603. The sub-stage 603 is related to environment characterization and related label generation. There are many alternative and/or additive manners in which to characterize an environment, examples of which will be presented hereinafter. At this point, however, it may be considered to be sufficient to understand that the characterization of the environment in the environment characterization and label generation sub-stage 603 involves the location management function 520 generating hierarchical multi-part labels and configuring a hierarchical labelling function, $A_h(\bullet)$. The hierarchical labelling function, $A_h(\bullet)$, receives, as input, a location, $(x,y,z)_q$, and produces, as output, a hierarchical label, $\ell_q$. The location management function 520 also configures, as part of the environment characterization and label generation sub-stage 603, an inverse, $A_h^{-1}(\bullet)$, of the hierarchical labelling function, $A_h(\bullet)$.

As illustrated in FIG. 5, the surveyor 508-A includes the GPS module 512. The surveyor 508-A may use the GPS module 512 to obtain GPS information while surveying an environment. Furthermore, the surveyor 508-A may include the GPS information when storing an input tensor. Accordingly, the location management function 520 may configure the hierarchical labelling function, $A_h(\bullet)$, based, in part, upon GPS information received from the surveyor 508-A in association with each input tensor. The location management function 520 may adjust weights in a hierarchical clustering algorithm, to be discussed hereinafter, such that grid points associated with GPS information for geographically proximate locations are associated with hierarchical labels that are within a particular hierarchy.

As illustrated in FIG. 5, the surveyor 508-A includes the map information database 514. The surveyor 508-A may use the map information database 514 to obtain map information while surveying an environment. Furthermore, the surveyor 508-A may include the map information when storing an input tensor. Accordingly, the location management function 520 may configure the hierarchical labelling function, $A_h(\bullet)$, based, in part, upon map information received from the surveyor 508-A in association with each input tensor. The location management function 520 may adjust weights in a hierarchical clustering algorithm, to be discussed hereinafter, such that grid points associated with map information for geographically proximate locations are associated with hierarchical labels that are within a particular hierarchy.

As illustrated in FIG. 5, the surveyor 508-A includes the vision sensing module 516. The surveyor 508-A may use the vision sensing module 516 to obtain vision information while surveying an environment. The vision information may take one or more forms among several possible forms. One form is a digital photograph. Vision information in the form of a digital photograph may be processed to allow for recognition of known landmarks. Another form is a LIDAR information. LIDAR relates to light ranging and detection and is often used in the area of computer vision for applications such as environment sensing for autonomous vehicles. Vision information in the form of LIDAR information may be processed to allow for recognition of known landmarks. The surveyor 508-A may include the vision information when storing an input tensor. Accordingly, the location management function 520 may configure the hierarchical labelling function, $A_h(\bullet)$, based, in part, upon vision information received from the surveyor 508-A in association with each input tensor. The location management function 520 may adjust weights in a hierarchical clustering algorithm, to be discussed hereinafter, such that grid points associated with vision information for the same landmarks are associated with hierarchical labels that are within a particular hierarchy.

As illustrated in FIG. 5, the surveyor 508-A may operate in the presence of a plurality of neighboring UEs including the secondary UE 508-B and the other UEs 508-C, 508-D, 508-E. The surveyor 508-A may perform an analysis of side-load (SL) signals received from the plurality of neighboring UEs 508 to determine a distance between the surveyor 508-A and each of the neighboring UEs 508. The surveyor 508-A may include the analysis when storing an input tensor. Accordingly, the location management function 520 may configure the hierarchical labelling function, $A_h(\bullet)$, based, in part, upon SL signal analysis received from the surveyor 508-A in association with each input tensor. The location management function 520 may adjust weights in a hierarchical clustering algorithm, to be discussed hereinafter, such that grid points associated with similar neighboring UE distance information are associated with hierarchical labels that are within a particular hierarchy.

The surveyor 508-A may record the identity of the neighboring UEs 508. The surveyor 508-A may include the identities when storing an input tensor. Accordingly, the location management function 520 may configure the hierarchical labelling function, $A_h(\bullet)$, based, in part, upon the identities of neighboring UEs 508 received from the surveyor 508-A in association with each input tensor. The location management function 520 may adjust weights in a hierarchical clustering algorithm, to be discussed hereinafter, such that grid points associated with similar neighboring UE identity information are associated with hierarchical labels that are within a particular hierarchy.

The surveyor 508-A may record the level of power received from each of the neighboring UEs 508. The surveyor 508-A may include the power level information when storing an input tensor. Accordingly, the location management function 520 may configure the hierarchical labelling function, $A_h(\bullet)$, based, in part, upon the power level information received from the surveyor 508-A in association with each input tensor. The location management function 520 may adjust weights in a hierarchical clustering algorithm, to be discussed hereinafter, such that grid points associated with similar neighboring UE received power level information are associated with hierarchical labels that are within a particular hierarchy.

It is known that Wi-Fi access points advertise themselves to in-range devices with a Service Set Identifier (SSID). The surveyor 508-A may record the SSID of one or more local Wi-Fi access points and may include the SSIDs when storing an input tensor. Accordingly, the location management function 520 may configure the hierarchical labelling function, $A_h(\bullet)$, based, in part, upon the SSIDs received from the surveyor 508-A in association with each input tensor. The location management function 520 may adjust weights in a hierarchical clustering algorithm, to be discussed hereinafter, such that grid points associated with similar SSIDs are associated with hierarchical labels that are within a particular hierarchy.

In a second stage 604, location encoding (labeling) takes place. Each grid point (fingerprint location, q) is associated, in the second stage 604, with a hierarchical label, $\ell_q$. The second stage 604 may be represented as implementing the hierarchical labelling function, $A_h(\bullet)$. In this way, output from the second stage 604 may be an entire training dataset $\mathcal{T} = \{(\hat{X}_q, \ell_q)\}_q$ that includes a hierarchical label, $\ell_q$, and a normalized input tensor, $\hat{X}_q$, for each of a plurality of grid points (fingerprint locations, q). Indeed, the number of grid points in the plurality may be represented by $|\mathcal{T}|$.

The training dataset $\mathcal{T} = \{(\hat{X}_q, \ell_q)\}_q$ may be used in a third stage 606 to train a hierarchical NN location classifier. The hierarchical NN location classifier may be represented as a function, $f(\bullet)$.

A fourth stage 608 may be considered to be representative of operation of the AI engine 522 of FIG. 5. Upon receipt of a normalized input tensor, $\hat{X}_q$, the AI engine 522 may implement the trained hierarchical NN location classifier to obtain the inferred hierarchical label, $\hat{\ell}_q$. The fourth stage 608 may be considered to implement the function, $f(\bullet)$, receiving, as input, a normalized input tensor, $\hat{X}_q$, and producing, as output, an inferred hierarchical label, $\hat{\ell}_q$, that is, $\hat{\ell}_q = f(\hat{X}_q)$.

A fifth stage 610 may be considered to be representative of operation of the location management function 520 of FIG. 5. Subsequent to receiving the inferred hierarchical label, $\hat{\ell}_q$, the location management function 520 may employ the inverse, $A_h^{-1}(\bullet)$, of the hierarchical labelling function, $A_h(\bullet)$, to convert the inferred hierarchical label, $\hat{\ell}_q$, to a predicted location, (x,y,z), that is, $A_h^{-1}(\hat{\ell}_q) = (x,y,z)$.

As discussed in relation to the second stage 604 of FIG. 6, a training dataset $\mathcal{T} = \{(\hat{X}_q, \ell_q)\}$ includes hierarchical labels, $\ell_q$, and a normalized input tensor, $\hat{X}_q$, of input channel measurements at a plurality of grid points (fingerprint locations, q).

It has been discussed hereinbefore that the surveyor 508-A may navigate through an environment, stopping at a grid point to probe the channel, where the probing involves collecting raw channel data. The surveyor 508-A then records the raw channel data for later processing. The channel that is probed has a plurality of subcarriers that traverse multiple paths from a transmission point, "TP" (e.g., the primary base station 506-P), with a plurality of transmit antennas (not shown) to a receiver (the surveyor 508-A) with a plurality of receive antennas (not shown).

The raw channel data may be considered to be represented as a vector, $h(t) = [h_k^{n_{rx}, n_{tx}}(t)]$, in a k-dimensional input space. That is, the raw data may be determined by the surveyor 508-A in an environment with a single TP. The surveyor 508-A receives, from the single TP 506-P, a single channel that has k subcarriers. The raw channel data vector, h(t), may include an element for every subcarrier among the k subcarriers. In a general form, the $k^{th}$ element of the raw channel data vector, h(t), may be given by:

$$h_k^{n_{rx}, n_{tx}}(t) = \sum_{n_{mp}=1}^{N_{mp}} \beta_{n_{mp}}(t) e^{-2\pi i f_k (\tau_{n_{mp}}^{n_{rx}, n_{tx}}(t))} + \mathcal{J}_k^{n_{rx}, n_{tx}}(t), \quad (1)$$

$$1 \le n_{rx} \le N_{rx}$$
$$1 \le n_{tx} \le N_{tx}$$
$$1 \le k \le N_{sc}$$

where $f_k$ is the frequency of the $k^{th}$ subcarrier, $N_{sc}$ is the number of subcarriers, $N_{rx}$ is the number of receive antennas, $N_{tx}$ is the number of transmit antennas, $N_{mp}$ is the number of multipath components, $\mathcal{J}_k^{n_{rx}, n_{tx}}(t)$ is the additive noise over the $k^{th}$ subcarrier, receive antenna $n_{rx}$ and transmit antenna $n_{tx}$ at time t. Notably, represented as a time-dependent signal, each element, $h_k^{n_{rx}, n_{tx}}(t)$, may look almost like white noise. Parameters of the raw channel data include $\tau_{n_{mp}}^{n_{rx}, n_{tx}}(t)$ and $\beta_{n_{mp}}(t)$. The parameter $\tau_{n_{mp}}^{n_{rx}, n_{tx}}(t)$ is a parameter that is indicative of a time-of-flight (ToF) of the channel over a particular path, $n_{mp}$, from a particular transmit antenna, $n_{tx}$, to a particular receive antenna, $n_{rx}$, at time t. The parameter $\beta_{n_{mp}}(t)$ is indicative of an amount of attenuation that may be measured as occurring along the particular path $n_{mp}$ at time t.

Due to the presence, in Equation (1), of the term $e^{-2\pi i f_k}$ $(\tau_{n_{mp}}^{n_{rx}, n_{tx}}(t))$, which may be referenced as a ray phase, $\zeta_{k, n_{mp}}^{n_{rx}, n_{tx}}$, it is known to be difficult for flat NN location classifiers to discover underlying dependencies that exist between wireless channel parameters $\tau_{n_{mp}}^{n_{rx}, n_{tx}}(t)$ and $\beta_{n_{mp}}(t)$. Discovering such underlying dependencies may be considered to be particularly challenging when training dataset size and computation power are both limited. Aspects of the present application involve pre-processing raw channel data into a form that is easy to understand for a hierarchical NN location classifier. Provided that a cross-covariance matrix preserves information about the parameters of the wireless channel, $\tau_{n_{mp}}^{n_{rx}, n_{tx}}(t)$ and $\beta_{n_{mp}}(t)$, the information remaining after pre-processing may be deemed sufficient for the task of location determination.

In accordance with an aspect of the present application, the pre-processing of the raw channel data has several steps, including: determining a frequency domain cross-covariance matrix; transforming the cross-covariance matrix from the frequency domain to a delay domain; zeroing out unimportant features of the delay domain cross-covariance matrix; concatenating cross-covariance matrices related to multiple base stations; and normalizing features. It should be clear that there are many others ways to pre-process raw channel data. The manner of pre-processing that is described in the following is presented for example purposes.

For the $j^{th}$ base station, a frequency domain cross-covariance matrix, $R_j$, may be determined as follows:

$$R_j = \mathcal{J}\langle h_j \cdot h_j^H \rangle. \tag{2}$$

If the expectation in (2) is taken with respect to the distribution of the vector, $h_j(t)$, within a stationarity region, i.e., within an area in which the statistics of a propagation channel remain constant, then the vector, $h_j(t)$, may be considered to be an ergodic process. A process is said to be ergodic if statistical properties of the process can be deduced from a single, sufficiently long, random sample of the process. Ensemble averaging may be shown to approximate the statistical averaging of Equation (2) with good precision, as follows:

$$R_j = \frac{1}{N_{rx}N_{tx}N_{pk}} \sum_{t=1}^{N_{pk}} \sum_{n_{tx}=1}^{N_{tx}} \sum_{n_{rx}=1}^{N_{rx}} h_j^{n_{rx},n_{tx}}(t) \cdot (h_j^{n_{rx},n_{tx}}(t))^H \tag{3}$$

where $h_j^{n_{rx},n_{tx}}(t) = [h_{j,k}^{n_{rx},n_{tx}}(t), \forall]^T$ is a vector of narrowband channels across the subcarrier domain of the base station, j. The ensemble averaging in Equation (3) may be shown to eliminate spurious small-scale ray phases, $\zeta_{k,n_{mp}}^{n_{rx},n_{tx}}$, resulting in $R_j = [r_{j,k,k'}]_{k,k'}$, whereby:

$$r_{j,k,k'} = \sum_{n_{mp}=1}^{N_{mp}} \beta_{n_{mp}}^2 e^{-2\pi i(k-k')\overline{\tau}_{n_{mp}}}, \tag{4}$$

$$1 \leq k, k' \leq N_{sc}$$

where $\overline{\tau}_{n_{mp}}$ is the average of $\tau_{n_{mp}}^{n_{rx},n_{tx}}$ on different transmit and receive antennas. Because $r_{j,k,k'}$ depends on k, k' only through their difference, m, where m=k−k', there are only $N_{sc}$ independent elements in the cross-covariance matrix $R_j$ (i.e., the cross-covariance matrix, $R_j$, may be described as a Toeplitz matrix). It follows that it is reasonable to use an m element column, $r_j$, of the cross-covariance matrix, $R_j$. The m elements may be given by:

$$r_{j,m} = \sum_{n_{mp}=1}^{N_{mp}} \beta_{n_{mp}}^2 e^{-2\pi i \cdot m \cdot \overline{\tau}_{n_{mp}}}, \tag{5}$$

$$1 \leq m \leq N_{sc}$$

Note that even though the range of m is $-N_{sc} < m < N_{sc}$, it is straightforward to show that $r_{j,m} = r_{j,-m}^*$. It follows that there are only $N_{sc}$ independent values an m element column, $r_j$, of the cross-covariance matrix, $R_j$.

The column, $r_j$, may be transformed, using an inverse fast Fourier transform, into a vector herein called a "delay spectrum vector," $\hat{r}j$, as follows:

$$\hat{r}_j = \mathcal{F}^{-1}\{r_j\}, \tag{6}$$

$$\hat{r}_{j,n_{mp}} = \sum_{n_{mp}=1}^{N_{mp}} \beta_{n_{mp}}^2 \epsilon_{n_{mp}} \text{sinc}_{N_{sc}}(n_{mp} - \lfloor w\overline{\tau}_{n_{mp}} \rfloor)$$

where $$\text{sinc}_{N_{sc}}(x) = \frac{\sin(\pi x)}{N_{sc}\sin\left(\frac{\pi x}{N_{sc}}\right)}$$

and $$\epsilon_{n_{mp}}$$

are complex terms.

The delay spectrum vectors, $\hat{r}_j$, may be considered similar to a partial dependence plot (PDP) that can be obtained from $\langle \mathcal{J} |_{\mathcal{F}^{-1}}\{h_j\}|^2 \rangle$ It is known that a PDP shows a marginal effect that one or two features can have on a predicted outcome of a ML algorithm. The delay spectrum vectors, $\hat{r}_j$ determined in Equation (6) may be considered to be differentiated from the PDP, $\mathcal{J}\langle |_{\mathcal{F}^{-1}}\{h_j\}|^2 \rangle$, in that the PDP has $\text{sinc}_N^2(x)$ components, rather than the $\text{sinc}_N(x)$ components found in Equation (6). Recall that the parameter $\beta_{n_{mp}}$ is indicative of an amount of attenuation that may be measured as occurring along the particular path $n_{mp}$. Recall, also, that $\overline{\tau}_{n_{mp}}$ is the average of $\tau_{n_{mp}}^{n_{rx},n_{tx}}$, the time of flight of the channel over the particular path, $n_{mp}$, from all transmit antennas, $n_{tx}$, to all receive antennas, $n_{rx}$. As is clear from Equation (6), there is information to be learned from the value of $\beta_{n_{mp}}^2$ and there is information to be learned in those locations, $n=\lfloor W\overline{\tau}_{n_{mp}} \rfloor$, where the sinc(•) functions peak. Note that the term W in Equation (6) is representative of receiver bandwidth, which is equal to the bandwidth of the channel. Therefore, there is no reason to keep the elements of the delay spectrum vectors, $\hat{r}_j$, for which $n \neq \lfloor W\overline{\tau}_{n_{mp}} \rfloor$. Indeed, the elements for which $n_{n_{mp}} \neq \lfloor W\overline{\tau}_{n_{mp}} \rfloor$ can render learning very difficult. Accordingly, the delay spectrum vectors, $\hat{r}_j$, may be transformed into trimmed delay spectrum vectors, $\tilde{r}_j$, by finding the peaks of the delay spectrum vectors, $\hat{r}_j$, keeping the peaks intact and zeroing out the rest of the elements of each delay spectrum vector, $\hat{r}_j$, as follows:

$$[\hat{n},\hat{p}] = \text{Peaks}(\hat{r}_j)$$

$$\tilde{r}_j = \hat{r}_j \odot v_j \tag{7}$$

where $\hat{n}$ are the indices of the peaks of the delay spectrum vector, $\hat{r}_j$, and where $\hat{p}$ are the powers of the peaks of the delay spectrum vector, $\hat{r}_j$, a peak selection vector $v_j = [v_{j,n}]_n$ is given by:

$$v_{j,n} = \begin{cases} 1, n \in \hat{n} \\ 0, n \notin \hat{n} \end{cases}$$

and where $\odot$ is representative of element-wise multiplication.

Because, in general, the UEs 508 can sense relay stations (not shown) to the primary base station 506-P, as well as relay stations (not shown) to the secondary base station 506-S, aspects of the present application relate to concatenating the trimmed delay spectrum vectors, $\tilde{r}_j$, from several base stations 506. Moreover, aspects of the present application relate to separating real parts and imaginary parts of the trimmed delay spectrum vectors, $\tilde{r}_j$, and treating the real parts and the imaginary parts as different channels in an un-normalized input tensor, $X_q$, as follows:

$$X_q = [[\text{Re}(\tilde{r}_1), \text{Im}(\tilde{r}_1)], \cdots, [\text{Re}(\tilde{r}_{N_{BS}}), \text{Im}(\tilde{r}_{N_{BS}})]]. \tag{8}$$

The un-normalized input tensor, $X_q$, is expected to be of dimension $N_{sc} \times N_{BS} \times 2$ for a given grid point (fingerprint location, q) with the hierarchical label $\ell_q$.

In any ML algorithm, feature normalization is a step towards efficient and quick learning. Even the most advanced ML algorithms have proven to have extreme difficulty in learning from features whose magnitudes are inhomogeneous. Feature normalization has been shown to alleviate this problem.

The un-normalized input tensor, $X_q$, has a plurality of elements, $x_{n,j,c,q}$, where n is an index of a peak, j is a reference to a particular subcarrier, q is a reference to a particular grid point and $c \in \{0,1\}$ indicates that the element is either a real part (0) or an imaginary part (1). Recall that, for the un-normalized input tensor, $X_q$, the real parts and the imaginary parts are treated as distinct channels. Taking each element, $x_{n,j,c,q}$, of the un-normalized input tensor, $X_q$, as an input feature, normalized elements, $\hat{x}_{n,j,c,q}$, may be determined as follows:

$$\bar{x}_{n,j,c} = \frac{1}{|\tau|} \sum_{q=1}^{|\tau|} x_{n,j,c,q},$$

$$\sigma^2_{n,j,c} = \frac{1}{|\tau|-1} \sum_{q=1}^{|\tau|} (x_{n,j,c,q} - \bar{x}_{n,j,c})^2$$

$$\hat{x}_{n,j,c,q} = \frac{(x_{n,j,c,q} - \bar{x}_{n,j,c})}{\sigma_{n,j,c}},$$

$$\hat{X}_q = [\hat{x}_{n,j,c,q}] \in \mathcal{C}^{N_{sc} \times N_{BS} \times 2}$$

(9)

In this way, the normalized input tensor, $\hat{X}_q$, portion of $\mathcal{T} = \{(\hat{X}_q, \ell_q)\}_q$ (the training dataset) is generated.

To this point, the input tensor information has been discussed as being recorded by the surveyor 508-A based, at least in part, on measured characteristics of subcarriers in a downlink (DL) channel from the primary base station 506-P. It should be clear that there exist alternatives to associating, with grid points, measured characteristics of the DL channel. For example, the primary base station 506-P may measure characteristics of subcarriers in an upload (UL) signal from the surveyor 508-A.

As part of the environment characterization and label generation sub-stage 603, the location management function 520 (FIG. 5) may carry out the generation of the hierarchical labels, $\ell_q$. It may be recalled that fingerprinting relies on assigning labels to locations.

On the one hand, to generate labels in the flat fingerprinting approach, a surveyor: navigates through the meshed environment; stops at a grid point to probe the channel; estimates coordinates for the grid point; randomly associates a location label to the grid point; determines channel data; records the channel data as a fingerprint; and pairs the fingerprint with the location label.

On the other hand, to generate labels in the hierarchical fingerprinting approach, more than just a random label assignment is preferred. Concretely, the objective, in label assignment, is to assign the same label to a plurality of locations that experience the same FoVs. To that end, aspects of the present application rely on the information that can be provided by each UE about a perception of respective neighborhoods as well the information that can be inferred by the network itself. The accuracy of label generation depends on how much information is at the disposal of the entity assigning the labels, which, in this case, is the location management function 520. On this basis, several embodiments have been envisioned, including embodiments wherein an environment map is available and embodiments wherein an environment map is not available.

Furthermore, when estimating the coordinates for the grid point 104, the surveyor 508-A may use a local coordinate system. Use of the local coordinate system may be shown to allow the primary base station 506-P in combination with the location management function 520 and the AI engine 522 to use the hierarchical NN location classifier (with some variations) for tasks other than location classification. Such other tasks may include mobility prediction and UE matching in multiple user multiple input multiple output (MU-MIMO), among others.

In an embodiment in which an environment map is available to the location management function 520, the location management function 520 may carry out label generation by (i) performing ray-tracing (RT) on the environment map and (ii) using an unsupervised clustering algorithm, e.g., a hierarchical clustering algorithm.

Figure 7:
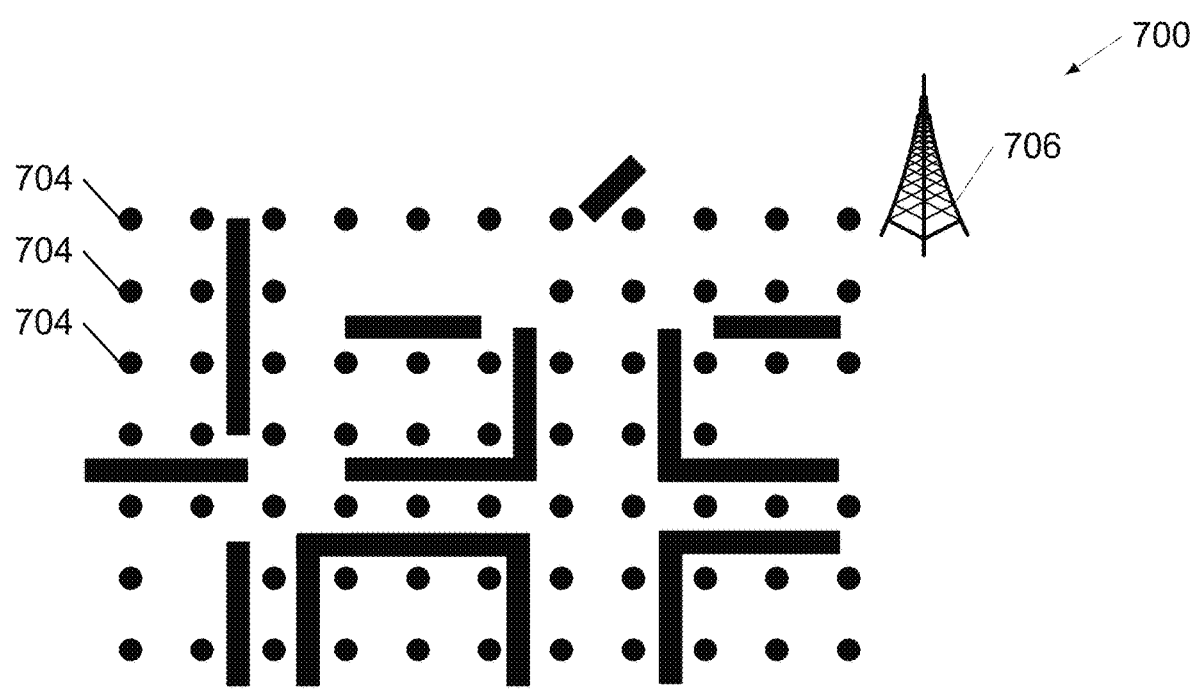
FIG. 7 illustrates an environment map.

An environment map 700 is illustrated in FIG. 7. The environment map 700 of FIG. 7 includes a serving base station 706 and a plurality of grid points 704. Only three of the grid points are specifically associated with the reference numeral 704. The location management function 520, upon receipt of the environment map 700 of FIG. 7, may perform ray-tracing on the environment map 700. Accordingly, the location management function 520 generates a high dimensional label vector for each grid point 704. The high-dimensional label vector may, for example, include elements such as: an angle-of-arrival (AoA) element; an angle-of-departure (AoD) element; a ToF (delay) element; and a power element.

Figure 8:
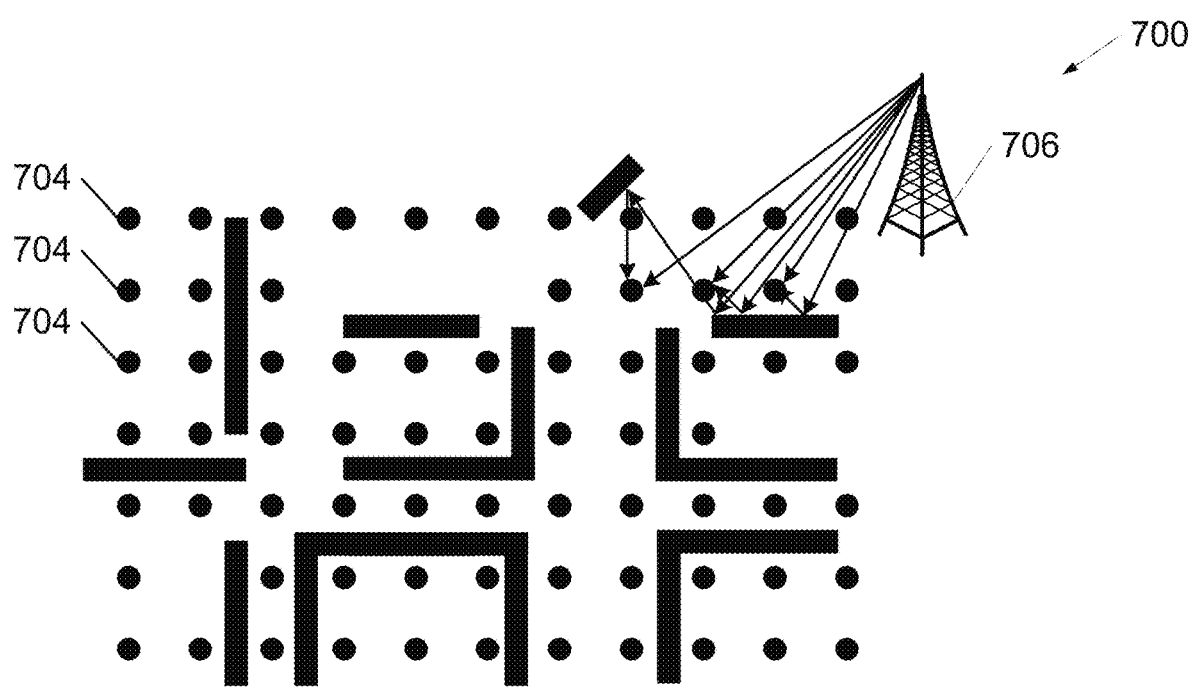
FIG. 8 illustrates a limited example of the performance of ray-tracing on the environment map of FIG. 7.

A limited example of the performance of ray-tracing on the environment map 700 is illustrated in FIG. 8.

Figure 9:
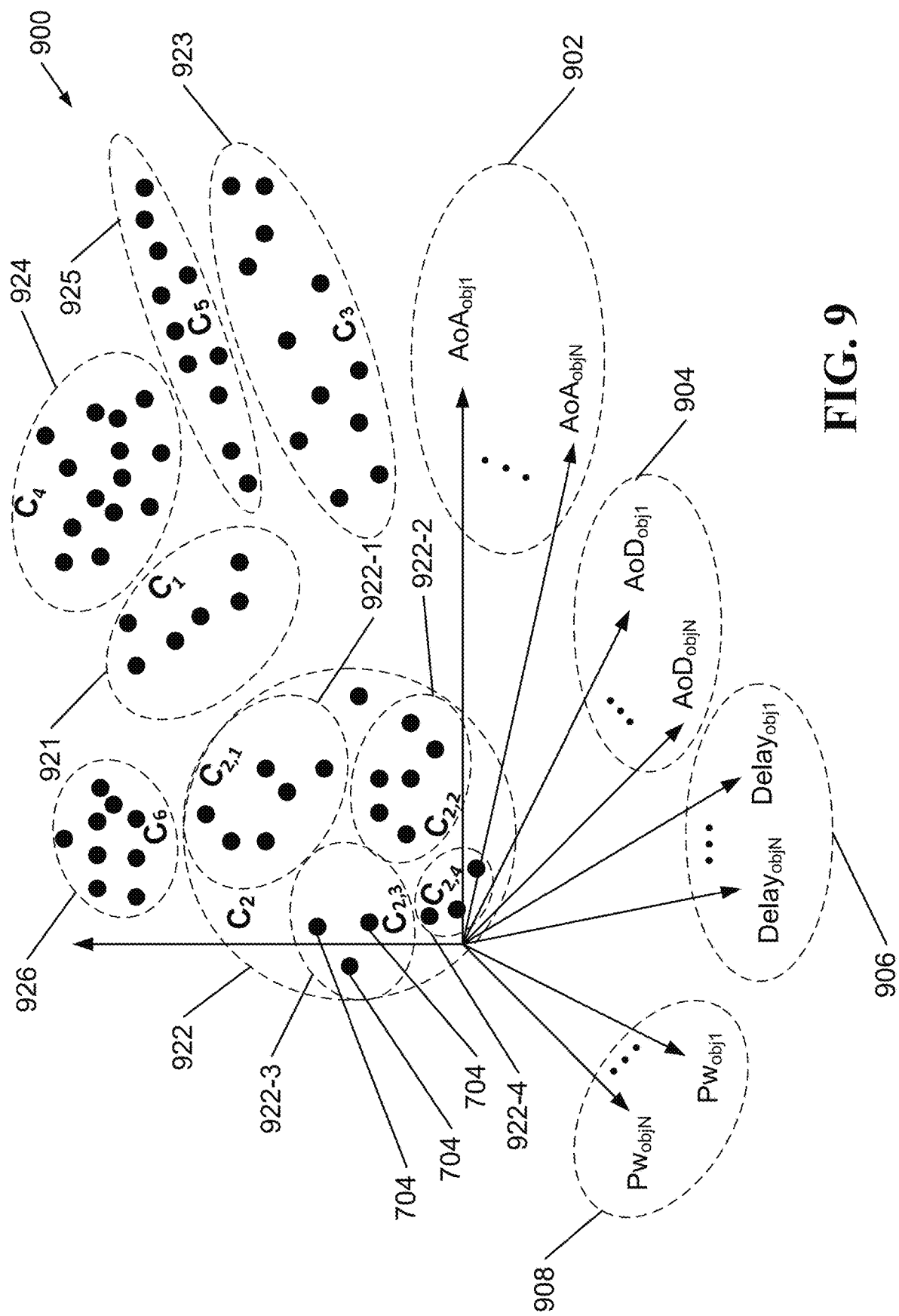
FIG. 9 illustrates clusters in a high-dimensional space corresponding to the high-dimensional space in which may be defined high-dimensional label vectors in accordance with aspects of the present application.

FIG. 9 illustrates a high-dimensional space 900 corresponding to the high-dimensional space in which the high-dimensional label vectors are defined by the location management function 520. FIG. 9 illustrates collections of vectors that help to define the high-dimensional space 900. In particular, FIG. 9 illustrates: a collection 902 of AoA vectors for objects 1 though N; a collection 904 of AoD vectors for objects 1 though N; a collection 906 of delay vectors for objects 1 though N; and a collection 908 of Pw (power) vectors for objects 1 though N.

The location management function 520 may map the high-dimensional label vector generated for each grid point 704 into the high-dimensional space 900. Indeed, FIG. 9 illustrates representatives of the plurality of grid points 704, from FIG. 7, mapped into the high-dimensional space 900 in a manner consistent with each corresponding high-dimensional label vector. Only three of the grid points shown are specifically associated with the reference numeral 704. Subsequent to performing the mapping, the location management function 520 may perform hierarchical clustering in the high-dimensional space 900 to, thereby, generate a hierarchical label for each grid point 704 among the plurality of grid points 704.

An example result of the hierarchical clustering in the high-dimensional space 900 is illustrated in FIG. 9. There are six topmost level clusters in the hierarchy: a first topmost level cluster "$C_1$" 921; a second topmost level cluster "$C_2$" 922; a third topmost level cluster "$C_3$" 923; a fourth topmost level cluster "$C_4$" 924; a fifth topmost level cluster "$C_5$" 925; and a sixth topmost level cluster "$C_6$" 926. The second topmost level cluster "$C_2$" 922 includes a first innermost level "$C_{2,1}$," 922-1, a second innermost level "$C_{2,2}$" 922-2, a third innermost level "$C_{2,3}$" 922-3 and a fourth innermost level "$C_{2,4}$" 922-4. Each of the six topmost levels 921, 922, 923, 924, 925, 926 includes a respective plurality of grid points 704. Each of the four innermost levels 922-1, 922-2, 922-3, 922-4, 922-5, 922-6 also includes a respective plurality of grid points 704.

Figure 10:
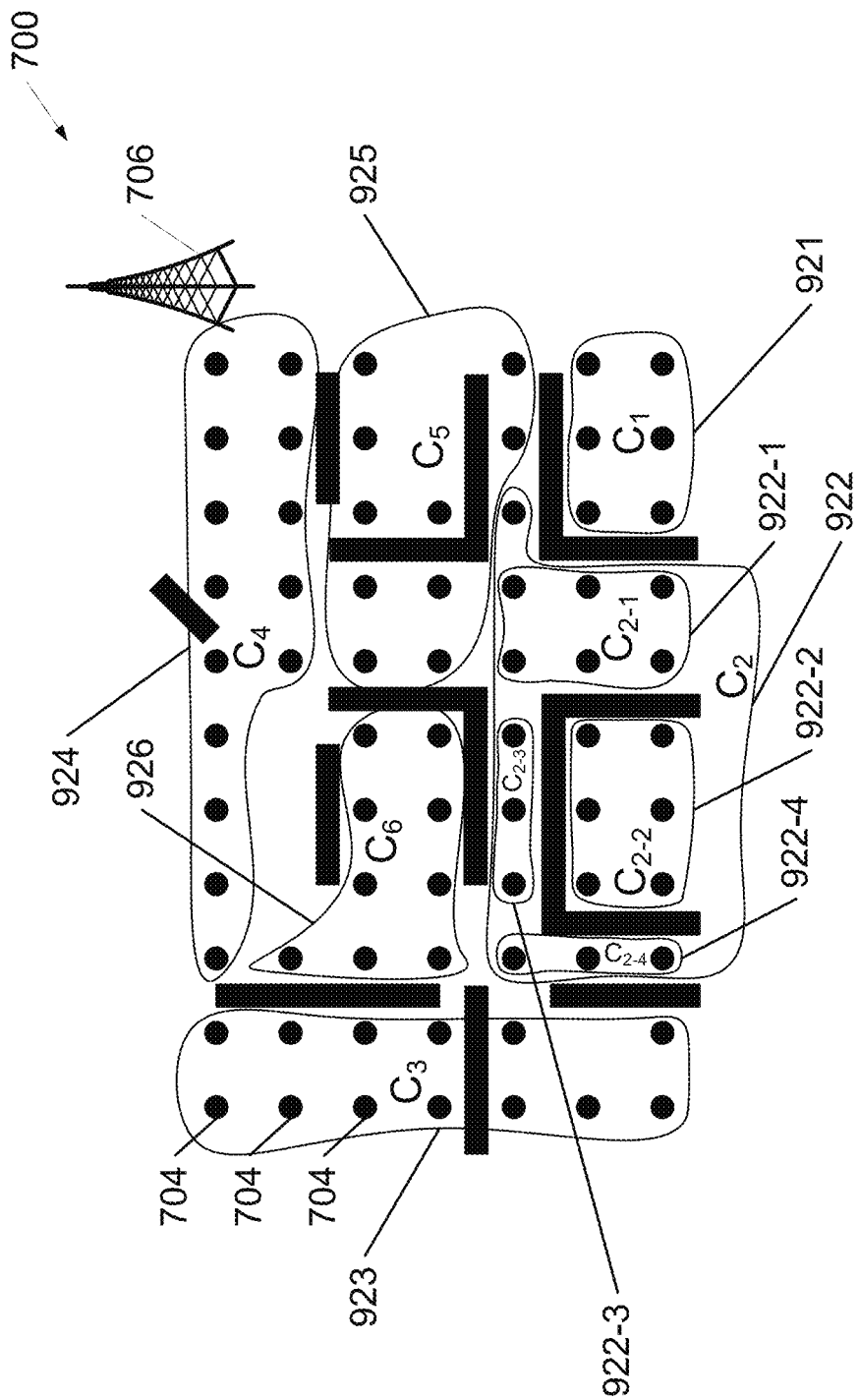
FIG. 10 illustrates the environment map of FIG. 7 with the addition of the clusters of FIG. 9.

FIG. 10 illustrates the environment map 700 of FIG. 7 with the addition of the clusters of FIG. 9. In particular, the first topmost level cluster "$C_1$," 921 includes six grid points 704. The second topmost level cluster "$C_2$" 922 includes 19 grid points 704. The third topmost level cluster "$C_3$" 923 includes 13 grid points 704. The fourth topmost level cluster "$C_4$" 924 includes 14 grid points 704. The fifth topmost level cluster "$C_5$" 925 includes ten grid points 704. The sixth topmost level cluster "$C_6$" 926 includes nine grid points. The grid points 704 in second topmost level cluster "$C_2$" 922 are further organized such that the first innermost level "$C_{2,1}$" 922-1 includes six grid points 704, the second innermost level "$C_{2,2}$" 922-2 includes six grid points 704, the third innermost level "$C_{2,3}$" 922-3 includes three grid points 704 and the fourth innermost level "$C_{2,4}$" 922-4 includes three grid points 704.

Upon completing the hierarchical clustering, the location management function 520 may use the hierarchical labels in the labeling of the locations (stage 604, FIG. 6), thereby leading to the training dataset $\mathcal{T} = \{(\hat{X}_q, \ell_q)\}_q$.

The hierarchical clustering for label generation may be based on any one of many known hierarchical clustering algorithms. However, for the hierarchical clustering algorithm to work efficiently, the input space is preferably a lower dimensional space. Because the dimensions of the input tensors can be very large, it is proposed herein to employ an auto-encoder as a dimensionality reduction tool.

Accordingly, rather than performing the hierarchical clustering in the high-dimensional space 900, the location management function 520 may perform the hierarchical clustering in the relatively lower-dimensional space that defines the output of the auto-encoder. Accordingly, there are options for the location management function 520 when generating a hierarchical label for each grid point 704 among the plurality of grid points.

In an embodiment in which an environment map is not available, the location management function 520 may utilize alternative techniques to generate labels. For example, it may be understood that increased "locality," that is, proximity of two grid points 704, may be shown to correlate with an increase in a likelihood that the surveyor 508-A will observe similar FoVs at the two grid points 704.

It follows that the location management function 520 may generate similar (if not the same) hierarchical labels for two grid points 704 that are close-by to one another whereas, in contrast, the location management function 520 may generate distinct hierarchical labels for grid points 704 that are distant from one another.

Even in the absence of prior knowledge, such as an available environment map, the location management function 520 may generate labels by "meshing" the environment 700. Given that a wireless channel changes continuously, it may be considered valid that the location management function 520 can operate on an expectation that a closeness, between two grid points 704, in a parameter space would correlate with closeness in normalized input tensors determined for the two grid points 704. Consider a case wherein, through pre-processing, a first normalized input tensor, $\hat{X}_1$, has been determined for a first grid point 704 and a second normalized input tensor, $\hat{X}_2$, has been determined for a second grid point 704. It follows that when $\hat{X}_1$ and $\hat{X}_2$ are close to each other in the high-dimensional input space, in which the normalized input tensors may be defined, the location management function 520 may make the assumption that $\hat{X}_1$ and $\hat{X}_2$ have probably been determined for two close-by grid points 704.

With this assumption in place, the location management function 520 can use unsupervised clustering algorithms (e.g., hierarchical clustering algorithms) to associate a hierarchical label, $\ell_q$, with each of the normalized input tensors, $\hat{X}_q$, that are associated with the grid points, q.

Once the location management function 520 has generated these labels, $\ell_q$, the labels may be used to form the training dataset, $\mathcal{T} = \{\hat{X}_q, \ell_q\}_q$, along with corresponding normalized input tensors, $\hat{X}_q$, to train the hierarchical NN location classifier in the third stage 606 in FIG. 6.

It is known that, to train a NN classifier, it helps to define a loss function. Accordingly, to train the hierarchical NN location classifier (the third stage 606 in FIG. 6), a single composite loss function may be defined. Notably, the single composite loss function includes several disjoint loss functions. Because each grid point is given a hierarchical label, $\ell_q$, that is a vector, an inferred hierarchical label, $\hat{\ell}_q$, is understood to be an output of the hierarchical NN location classifier.

Because the task under consideration is classification, each of the outputs of the hierarchical NN location classifier is arranged to terminate with a terminal SoftMax layer, so that the final, trained hierarchical NN location classifier approximates, at each terminal SoftMax layer, a conditional probability mass function (PMF) of classes.

The hierarchical NN location classifier uses weights, W, to process $|\mathcal{T}|$ normalized input tensors, $\hat{X}_q$, to produce, at one output level among H output levels one inferred hierarchical label, $\hat{\ell}_q$, among C inferred hierarchical labels, $\hat{\ell}_q$. A composite loss function for the hierarchical NN location classifier may defined as follows:

$$\mathcal{L}(W) = \frac{1}{|\mathcal{T}|} \sum_{q=1}^{|\mathcal{T}|} \sum_{c=1}^{C} \sum_{h=1}^{H} w_h \mathcal{L}_{q,c,h}(W) \qquad (10)$$

where $$\mathcal{L}_{q,c,h}(W) = \ell_{q,c,h} \log(f_{W,c,h}(\hat{X}_q)) + (1 - \ell_{q,c,h}) \log(1 - f_{W,c,h}(\hat{X}_q)).$$

With $f_W(\cdot)$ representing the hierarchical NN location classifier using weights, W, it follows that $f_{W,c,h}(\hat{X}_q)$ may be used to represent the $c^{th}$ output value at the $h^{th}$ level responsive to the $q^{th}$ normalized input tensor, $\hat{X}_q$, and $\ell_{q,c,h}$ is the $c^{th}$ value of the $h^{th}$ ground-truth label vector in the hierarchical label set of the $q^{th}$ normalized input tensor, $\hat{X}_q$. Level weights, $w_h$, are hyper-parameters that allow the placement of different emphasis on different output levels (e.g., the topmost level, the middle level and the innermost level) of the hierarchy.

Accordingly, in the third stage 606 in FIG. 6, the location management function 520 trains the hierarchical NN location classifier by adjusting the weights, W, until the single composite loss function of Equation (10) has been minimized.

Figure 11:
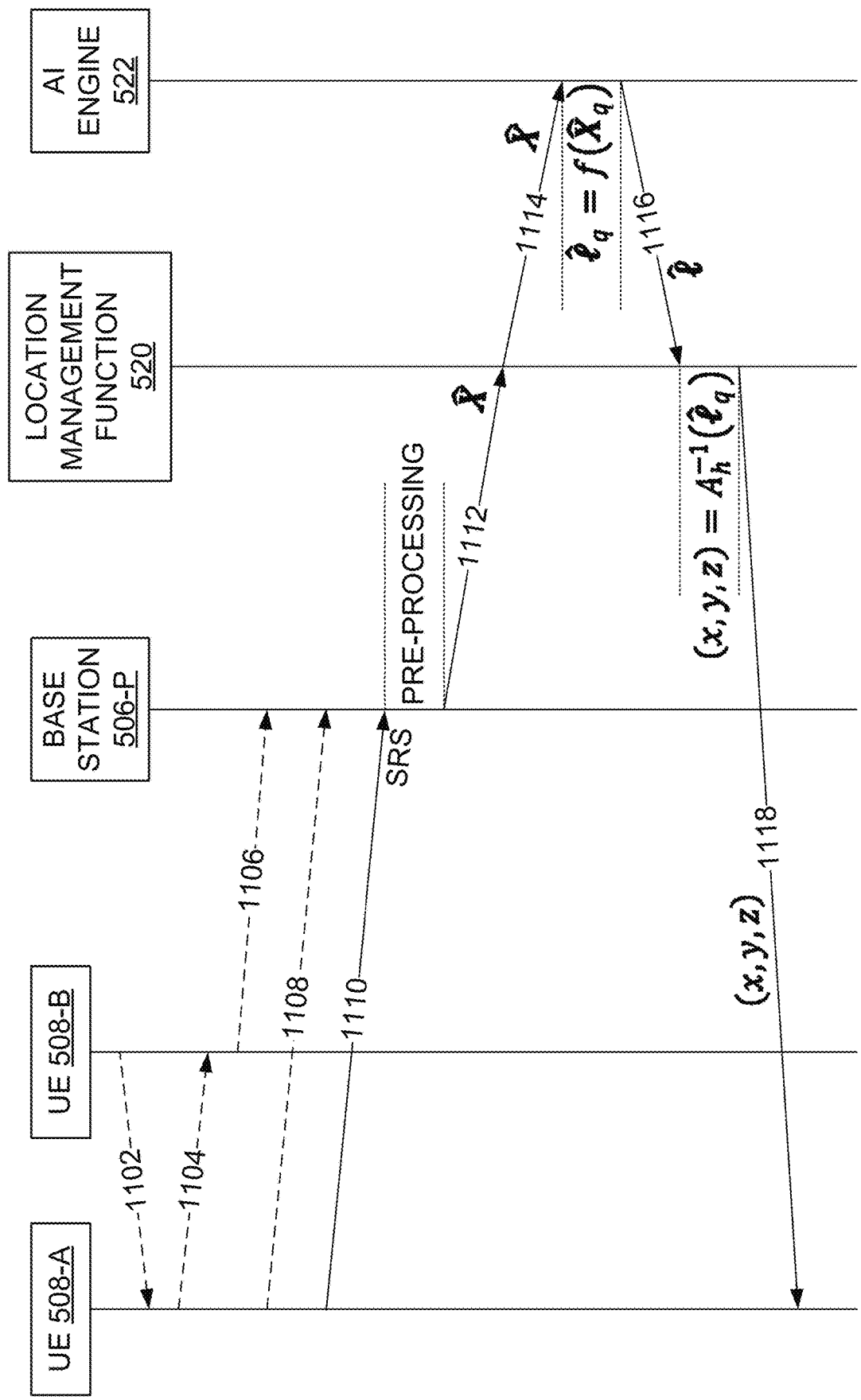
FIG. 11 illustrates, in a signal flow diagram, operation of aspects of the present application.

FIG. 11 illustrates, in a signal flow diagram, operation of aspects of the present application.

At a first signal trace 1102, the primary UE 508-A receives a side-load signal from the secondary UE 508-B.

At a second signal trace 1104, the secondary UE 508-B receives a side-load signal from the primary UE 508-A.

At a third signal trace 1106, the primary base station 506-P receives an upload signal from the secondary UE 508-B. The upload signal may, in part, include an indication of measurements made when the secondary UE 508-B received the side-load signal (the second signal trace 1104) from the primary UE 508-A.

At a fourth signal trace 1108, the primary base station 506-P receives an upload signal from the primary UE 508-A. The upload signal may, in part, include an indication of measurements made when the primary UE 508-A received the side-load signal (the first signal trace 1102) from the secondary UE 508-B.

At a fifth signal trace 1110, the primary base station 506-P receives a sounding reference signal (SRS) from the primary UE 508-A. The SRS may, in part, include indications of measurements made by various elements of the primary UE 508-A. For one example, the SRS may include indications of measurements made by the GPS module 512. For another example, the SRS may include indications of information extracted from the map information database 514. For a further example, the SRS may include indications of measurements made by the vision sensing module 516. The information included in the SRS may be considered to be useful in the environment characterization and label generation sub-stage 603 in FIG. 6. The information included in the SRS may also include an un-normalized input tensor, $X_q$.

The primary base station 506-P may pre-process the un-normalized input tensor, $X_q$, as described in view of Equation (9), to produce a normalized input tensor, $\hat{X}_q$.

At a sixth signal trace 1112, the location management function 520 receives the normalized input tensor, $\hat{X}_q$, from the primary base station 506-P.

At a seventh signal trace 1114, the AI engine 522 receives the normalized input tensor, $\hat{X}_q$, from the location management function 520. Upon receipt of the normalized input tensor, $\hat{X}_q$, the AI engine 522 may implement the trained hierarchical NN location classifier to carry out the fourth stage 608 (FIG. 6) to obtain the inferred hierarchical label, $\hat{\ell}_q$.

At an eighth signal trace 1116, the location management function 520 receives the inferred hierarchical label, $\hat{\ell}_q$, from the AI engine 522. The location management function 520 may carry out the fifth stage 610 (FIG. 6) by employing the inverse, $A_h^{-1}(\bullet)$, of the hierarchical labelling function, $A_h(\bullet)$, to convert the inferred hierarchical label, $\hat{\ell}_q$, to a predicted location, (x,y,z), that is, $A_h^{-1}(\hat{\ell}_q)=(x,y,z)$.

At a ninth signal trace 1118, the primary UE 508-A receives an indication of the predicted location from the location management function 520.

Figure 12A:
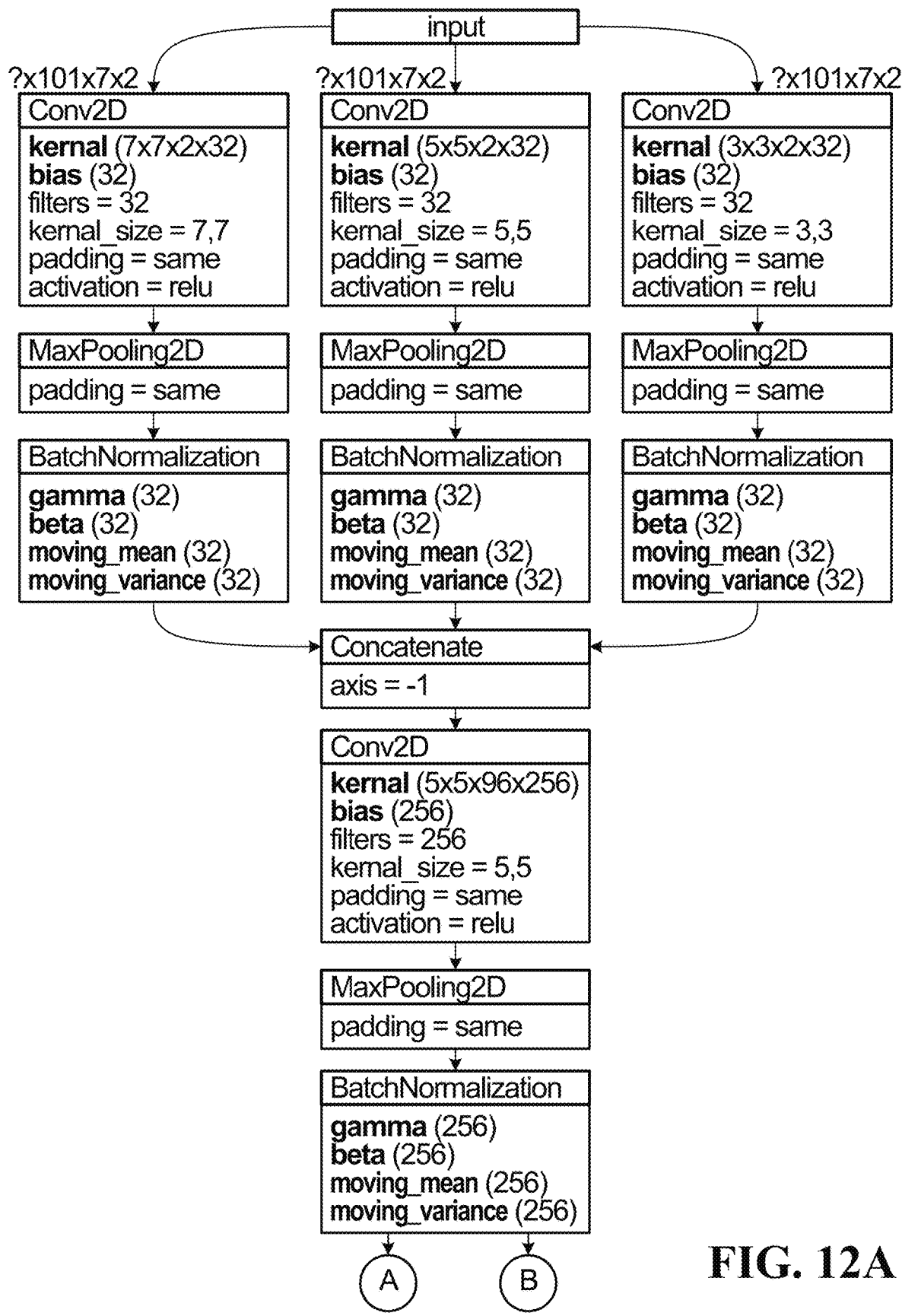
FIG. 12A illustrates a first part of a schema for an example hierarchical neural network location classifier in accordance with aspects of the present application.
Figure 12B:
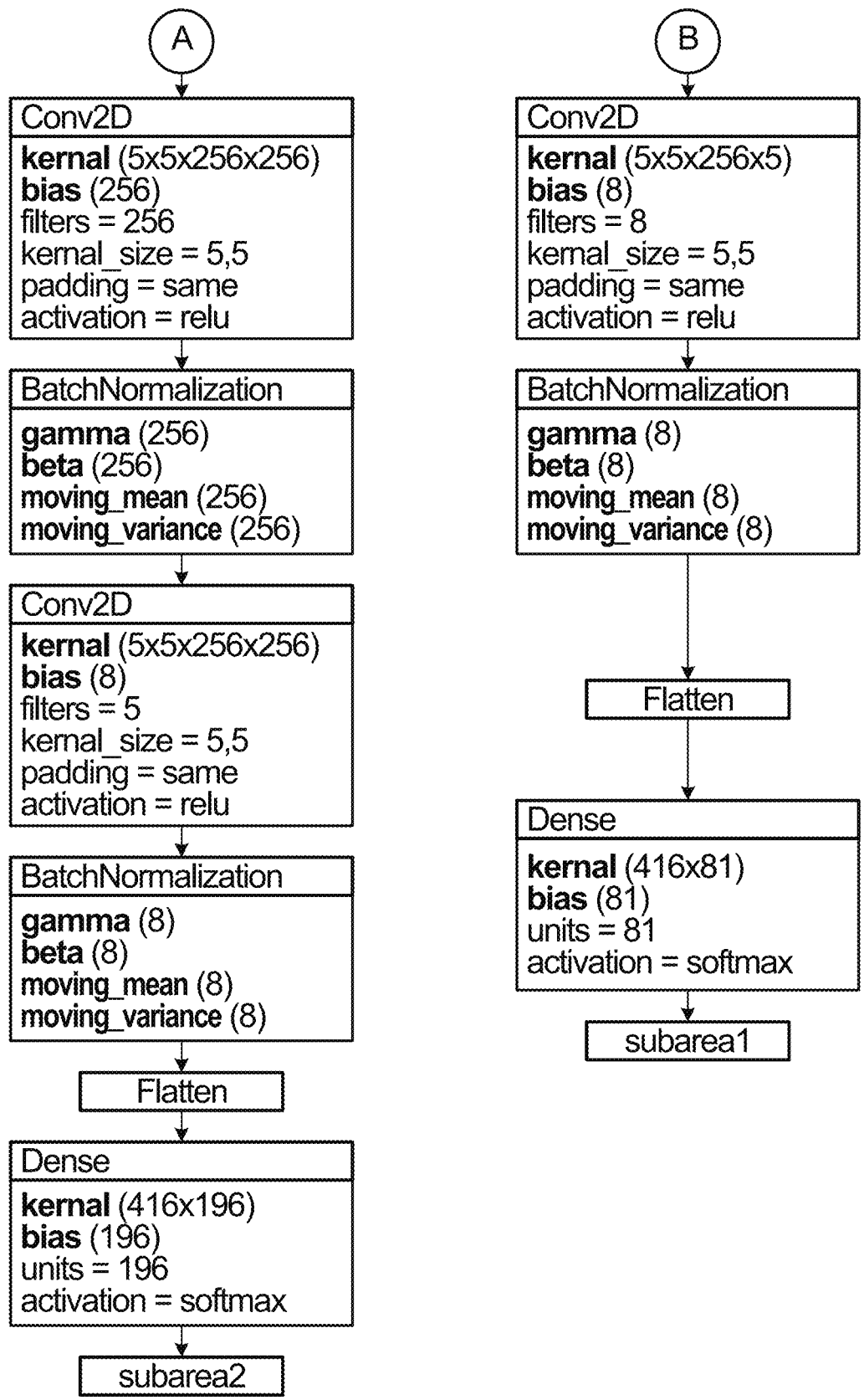
FIG. 12B illustrates a second part of the schema of FIG. 12A, in accordance with aspects of the present application.

In combination, FIG. 12A and FIG. 12B illustrate a schema for an example hierarchical NN location classifier 1200. The output of the example hierarchical NN location classifier 1200 occurs on two levels. The example hierarchical NN location classifier 1200 includes convolutional layers, max pooling layers, batch normalization layers, etc.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A single-transmission-point user equipment (UE) locating method, the method comprising:
   receiving a reference signal;
   obtaining, by processing the reference signal, a normalized input tensor;
   obtaining, through use of a hierarchical neural network location classifier, an inferred hierarchical label for a location corresponding to the normalized input tensor;
   obtaining a predicted location by decoding the inferred hierarchical label; and
   transmitting an indication of the predicted location.

2. The method of claim 1 wherein the decoding comprises employing an inverse of a hierarchical labelling function, where the hierarchical labelling function is configured to receive, as input, a particular location and produce, as output, a particular hierarchical label to associate with the particular location.

3. The method of claim 2 further comprising:
   receiving map information for an environment for the UE; and
   carrying out ray-tracing on the map information to, thereby, generate a plurality of label vectors, with an individual label vector associated with each point among a plurality of points in the environment.

4. The method of claim 3 further comprising configuring the hierarchical labelling function based upon applying a hierarchical clustering algorithm to the plurality of label vectors.

5. The method of claim 3 further comprising:
   applying a dimensionality reduction tool to the plurality of label vectors to, thereby, generate a plurality of reduced-dimensionality label vectors; and
   configuring the hierarchical labelling function based upon applying a hierarchical clustering algorithm to the plurality of reduced-dimensionality label vectors.

6. The method of claim 5 wherein the dimensionality reduction tool comprises an auto-encoder.

7. The method of claim 2 further comprising configuring the hierarchical labelling function based upon global positioning system information associated with an un-normalized input tensor.

8. The method of claim 2 further comprising configuring the hierarchical labelling function based upon vision sensing information associated with an un-normalized input tensor.

9. The method of claim 2 further comprising configuring the hierarchical labelling function based upon map information associated with an un-normalized input tensor.

10. The method of claim 1 wherein the inferred hierarchical label includes a plurality of label parts and each label part among the plurality of label parts is encoded using one-hot encoding.

11. An apparatus for location management, the apparatus comprising:
a memory storing instructions; and
a processor caused, by the instructions, to:
receive a reference signal;
obtain, by processing the reference signal, a normalized input tensor;
obtain, through use of a hierarchical neural network location classifier, an inferred hierarchical label for a location corresponding to the normalized input tensor;
obtain a predicted location by decoding the inferred hierarchical label; and
transmit an indication of the predicted location.

12. The apparatus of claim 11 wherein the processor is further caused to obtain the predicted location by employing an inverse of a hierarchical labelling function, where the hierarchical labelling function is configured to receive, as input, a particular location and produce, as output, a particular hierarchical label to associate with the particular location.

13. The apparatus of claim 12 wherein the processor is further caused to:
receive map information for an environment for the UE; and
carry out ray-tracing on the map information to, thereby, generate a plurality of label vectors, with an individual label vector associated with each point among a plurality of points in the environment.

14. The apparatus of claim 13 wherein the processor is further caused to configure the hierarchical labelling function based upon applying a hierarchical clustering algorithm to the plurality of label vectors.

15. The apparatus of claim 13 wherein the processor is further caused to:
apply a dimensionality reduction tool to the plurality of label vectors to, thereby, generate a plurality of reduced-dimensionality label vectors; and
configure the hierarchical labelling function based upon applying a hierarchical clustering algorithm to the plurality of reduced-dimensionality label vectors.

16. The apparatus of claim 15 wherein the dimensionality reduction tool comprises an auto-encoder.

17. The apparatus of claim 12 wherein the processor is further caused to configure the hierarchical labelling function based upon global positioning system information associated with an un-normalized input tensor.

18. The apparatus of claim 12 wherein the processor is further caused to configure the hierarchical labelling function based upon vision sensing information associated with an un-normalized input tensor.

19. The apparatus of claim 12 wherein the processor is further caused to configure the hierarchical labelling function based upon map information associated with an un-normalized input tensor.

20. The apparatus of claim 12 wherein the inferred hierarchical label includes a plurality of label parts and each label part among the plurality of label parts is encoded using one-hot encoding.

21. A computer-readable medium storing instructions for location management, the instructions, when executed by a processor, causing the processor to:
receive a reference signal;
obtain, by processing the reference signal, a normalized input tensor;
obtain, through use of a hierarchical neural network location classifier, an inferred hierarchical label for a location corresponding to the normalized input tensor;
obtain a predicted location by decoding the inferred hierarchical label; and
transmit an indication of the predicted location.

22. The computer-readable medium of claim 21 wherein the instructions further cause the processor to obtain the predicted location by employing an inverse of a hierarchical labelling function, where the hierarchical labelling function is configured to receive, as input, a particular location and produce, as output, a particular hierarchical label to associate with the particular location.

23. The computer-readable medium of claim 22 wherein the instructions further cause the processor to:
receive map information for an environment for the UE; and
carry out ray-tracing on the map information to, thereby, generate a plurality of label vectors, with an individual label vector associated with each point among a plurality of points in the environment.

24. The computer-readable medium of claim 22 wherein the instructions further cause the processor to configure the hierarchical labelling function based upon map information associated with an un-normalized input tensor.

25. The computer-readable medium of claim 21 wherein the inferred hierarchical label includes a plurality of label parts and each label part among the plurality of label parts is encoded using one-hot encoding.

* * * * *